United States Patent
Lv et al.

(10) Patent No.: US 12,136,369 B2
(45) Date of Patent: Nov. 5, 2024

(54) ROTATING DISPLAY APPARATUS AND METHOD OF DRIVING THE SAME

(71) Applicant: BOE TECHNOLOGY GROUP CO., LTD., Beijing (CN)

(72) Inventors: Yaoyu Lv, Beijing (CN); Jiyang Shao, Beijing (CN); Guixin Yan, Beijing (CN); Menglei Zhang, Beijing (CN); Lili Chen, Beijing (CN); Hao Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/915,848

(22) PCT Filed: May 28, 2021

(86) PCT No.: PCT/CN2021/096882
§ 371 (c)(1),
(2) Date: Dec. 1, 2022

(87) PCT Pub. No.: WO2022/246820
PCT Pub. Date: Dec. 1, 2022

(65) Prior Publication Data
US 2024/0212537 A1     Jun. 27, 2024

(51) Int. Cl.
| | |
|---|---|
| *G09G 3/00* | (2006.01) |
| *G02B 30/54* | (2020.01) |
| *G09F 9/37* | (2006.01) |
| *G09F 19/02* | (2006.01) |
| *G09G 3/20* | (2006.01) |
| *G09G 3/32* | (2016.01) |
| *G09G 3/3275* | (2016.01) |
| *G09F 19/12* | (2006.01) |

(52) U.S. Cl.
CPC ........... *G09G 3/005* (2013.01); *G09G 3/2003* (2013.01); *G09G 3/3275* (2013.01); *G02B 30/54* (2020.01);
(Continued)

(58) Field of Classification Search
CPC .... G09G 3/005; G09G 3/2003; G09G 3/3275; G09G 2300/0439; G09G 3/32;
(Continued)

(56) References Cited

U.S. PATENT DOCUMENTS

| | | | |
|---|---|---|---|
| 10,114,492 B2 * | 10/2018 | Takagi | G06F 3/0338 |
| 11,977,244 B2 * | 5/2024 | Castleman | G02B 30/54 |

(Continued)

FOREIGN PATENT DOCUMENTS

| | | |
|---|---|---|
| CN | 101022565 A | 8/2007 |
| CN | 102282675 A | 12/2011 |

(Continued)

OTHER PUBLICATIONS

First Office Action for Chinese Patent Application No. 202180001349.5 issued by the Chinese Patent Office on Feb. 27, 2023.

*Primary Examiner* — Douglas M Wilson
(74) *Attorney, Agent, or Firm* — IP & T GROUP LLP

(57) ABSTRACT

A rotating display apparatus is provided. The rotating display apparatus includes a pixel array and a control device. The pixel array is capable of rotating around a rotation axis in the pixel array, the pixel array includes a plurality of pixel units, and the plurality of pixel units are arranged in a plurality of pixel columns distributed in a direction perpendicular to the rotation axis. Pixel units in each pixel column are arranged in a direction parallel to the rotation axis and operate at a same refresh frequency. A refresh frequency of pixel units in a pixel column close to the rotation axis is less than a refresh frequency of pixel units in a pixel column far away from the rotation axis. The control device is configured to control the pixel units in each pixel column to operate at a refresh frequency corresponding to the pixel column.

20 Claims, 19 Drawing Sheets

(52) U.S. Cl.
CPC ............... *G09F 9/37* (2013.01); *G09F 19/02* (2013.01); *G09F 19/125* (2021.05); *G09G 3/2088* (2013.01); *G09G 3/32* (2013.01); *G09G 2300/0439* (2013.01); *G09G 2310/02* (2013.01)

(58) Field of Classification Search
CPC .. G09G 3/2088; G09G 2310/02; G02B 30/54; G09F 9/37; G09F 19/02; G09F 19/125
See application file for complete search history.

(56) References Cited

U.S. PATENT DOCUMENTS

| | | | |
|---|---|---|---|
| 2008/0043014 A1* | 2/2008 | Tachi | G02B 30/54 |
| | | | 348/E13.056 |
| 2010/0123694 A1 | 5/2010 | Cok et al. | |
| 2019/0237021 A1 | 8/2019 | Peng et al. | |
| 2021/0193067 A1 | 6/2021 | Shao et al. | |
| 2022/0139344 A1 | 5/2022 | Shao et al. | |

FOREIGN PATENT DOCUMENTS

| | | |
|---|---|---|
| CN | 102291589 A | 12/2011 |
| CN | 104732592 A | 6/2015 |
| CN | 110023881 A | 7/2019 |
| CN | 110322801 A | 10/2019 |
| CN | 110602477 A | 12/2019 |
| CN | 110996093 A | 4/2020 |
| CN | 112213867 A | 1/2021 |
| CN | 112634799 A | 4/2021 |
| JP | 2007-33995 A | 2/2007 |
| KR | 10-2020-0054644 A | 5/2020 |
| WO | 2021046757 A1 | 3/2021 |

* cited by examiner (a)

(b)

(c)

(a)

(b)

(c)

ROTATING DISPLAY APPARATUS AND METHOD OF DRIVING THE SAME

CROSS-REFERENCE TO RELATED APPLICATION

This application is a national phase entry under 35 USC 371 of International Patent Application No. PCT/CN2021/096882, filed on May 28, 2021, which is incorporated herein by reference in its entirety.

TECHNICAL FIELD

The present disclosure relates to the field of display technologies, and in particular, to a rotating display apparatus and a method of driving the same.

BACKGROUND

A stereoscopic rotating display technology is a true three-dimensional display technology. A user can see stereoscopic images without wearing 3D glasses when viewing a stereoscopic rotating display apparatus. The stereoscopic rotating display apparatus utilizes high-speed rotation of a display panel in combination with a persistence-of-vision effect of human eyes to form a stereoscopic display space, thereby achieving a three-dimensional display effect SUMMARY In an aspect, a rotating display apparatus is provided. The rotating display apparatus includes a pixel array and a control device. The pixel array is capable of rotating around a rotation axis in the pixel array. The pixel array includes a plurality of pixel units, and the plurality of pixel units are arranged in a plurality of pixel columns distributed in a direction perpendicular to the rotation axis. Pixel units in each pixel column are arranged in a direction parallel to the rotation axis and operate at a same refresh frequency. A refresh frequency of pixel units in a pixel column close to the rotation axis is less than a refresh frequency of pixel units in a pixel column far away from the rotation axis. The control device is configured to control the pixel units in each pixel column to operate at a refresh frequency corresponding to the pixel column.

In a possible implementation manner, the plurality of pixel columns are divided into a plurality of pixel groups, and each pixel group includes at least one pixel column distributed continuously, and refresh frequencies of pixel units in each pixel group are the same. In pixel columns located on a same side of the rotation axis, refresh frequencies of pixel groups arranged in a direction away from the rotation axis gradually increase.

In a possible implementation manner, in the plurality of pixel groups, a number of pixel columns included in each pixel group is the same. Alternatively, in the plurality of pixel groups and in the pixel columns located on the same side of the rotation axis, numbers of pixel columns included in the pixel groups arranged in the direction away from the rotation axis sequentially decrease.

In a possible implementation manner, in the pixel columns located on the same side of the rotation axis, the refresh frequencies of the pixel groups arranged in the direction away from the rotation axis constitutes an arithmetic progression.

In a possible implementation manner, each pixel unit in the pixel column faraway from the rotation axis forms a plurality of first voxels, and each pixel unit in the pixel column close to the rotation axis forms a plurality of second voxels. A first voxel distance is equal to a second voxel distance. The first voxel distance is a distance between two adjacent first voxels. The second voxel distance is a distance between two adjacent second voxels.

In a possible implementation manner, the rotation axis is a symmetry axis of the pixel array. Refresh frequencies of two pixel columns respectively located on different sides of the rotation axis and having a same distance to the rotation axis are the same.

In a possible implementation manner, the control device includes a plurality of drivers, and each driver is coupled to a single pixel unit. The driver is configured to: receive driving information including an identifier and pixel data of at least one pixel unit; identify an identifier of a pixel unit coupled thereto that is included in the identifier of the at least one pixel unit; and drive, according to pixel data of the pixel unit coupled thereto in the driving information, the pixel unit coupled thereto to operate at a refresh frequency of the pixel unit coupled thereto.

In a possible implementation manner, the driver is further configured to: identify that the identifier of the pixel unit coupled thereto is not included in the identifier of the at least one pixel unit; and drive the pixel unit coupled thereto to maintain a currently displayed color at the refresh frequency of the pixel unit coupled thereto.

In a possible implementation manner, the driver is further configured to: receive a frequency indication signal, a frequency of the frequency indication signal being the refresh frequency of the pixel unit coupled to the driver; and drive, according to the driving information, the pixel unit coupled to the driver to operate at the frequency of the frequency indication signal. Alternatively, the driver is further configured to: store received pixel data of the pixel unit coupled thereto in sequence according to a writing frequency; and read the stored pixel data in a stored order at the refresh frequency of the pixel unit coupled thereto, so as to drive, according to the read pixel data, the pixel unit coupled thereto to operate at the refresh frequency of the pixel unit coupled thereto. The writing frequency is greater than or equal to the refresh frequency of the pixel unit coupled to the driver.

In a possible implementation manner, the driver includes a storage queue. The driver is configured to: receive the pixel data of the pixel unit coupled thereto; write the received pixel data of the pixel unit coupled thereto into the storage queue at the writing frequency; read the pixel data from the storage queue in a written order at a reading frequency, the reading frequency being the refresh frequency of the pixel unit coupled to the driver; and generate a driving signal according to the read pixel data, the driving signal being configured to drive the pixel unit coupled to the driver to operate.

In a possible implementation manner, the control device further includes a processor, and the processor is coupled to the plurality of drivers and is configured to send the driving information to each driver.

In a possible implementation manner, the rotating display apparatus further includes a plurality of data lines. Drivers respectively coupled to at least two pixel units in a single pixel column are coupled to the processor through a data line. The processor is configured to send the driving information to the drivers coupled to the data line. The driving information includes the identifier and pixel data of the at least one pixel unit in the at least two pixel units coupled to the data line.

In a possible implementation manner, drivers coupled to the single pixel column are divided into at least two driver groups. Drivers in a driver group are coupled to the processor through one data line, and drivers in different driver groups are coupled to the processor through different data lines.

In a possible implementation manner, the processor is configured to send the driving information to each driver at a first sending frequency corresponding to the driver. The first sending frequency corresponding to the driver is equal to the refresh frequency of the pixel unit coupled to the driver. Alternatively, the processor is configured to send the driving information to each driver at a second sending frequency. The second sending frequency is greater than or equal to a refresh frequency of each pixel unit in the pixel array.

In a possible implementation manner, in a case where pixel data of the pixel unit coupled to the driver in a current pixel frame is different from pixel data of the pixel unit in a previous pixel frame, the driving information sent by the processor to the driver includes the identifier of the pixel unit and the pixel data of the pixel unit in the current pixel frame. In a case where the pixel data of the pixel unit coupled to the driver in the current pixel frame is the same as the pixel data of the pixel unit in the previous pixel frame, the driving information sent by the processor to the driver does not include the identifier of the pixel unit and the pixel data of the pixel unit in the current pixel frame.

In a possible implementation manner, the plurality of pixel units are further arranged in a plurality of pixel rows each arranged in a direction perpendicular to the rotation axis. The rotating display apparatus further includes a plurality of gate lines. Drivers respectively coupled to at least two pixel units in a pixel row are coupled to the processor through a gate line. The processor is further configured to send a turn-on signal to each driver coupled to the gate line, and is further configured to send the identifier of the pixel unit coupled to the driver to the driver. The driver is further configured to: receive the turn-on signal; receive the identifier of the pixel unit coupled to the driver in response to the turn-on signal; and write the received identifier of the pixel unit into the driver.

In a possible implementation manner, the rotating display apparatus further includes a plurality of switches and a plurality of data lines. The processor is coupled to at least two gate lines through a switch in the plurality of switches. Drivers respectively coupled to at least two pixel units in a single pixel column are coupled to the processor through a data line in the plurality of data lines. A number of gate lines coupled to the switch is equal to a number of data lines coupled to the single pixel column.

In a second aspect, a method of driving a rotating display apparatus is provided. The method includes:

sending, by a processor, driving information to drivers coupled to a data line, the driving information including an identifier and pixel data of at least one pixel unit in at least two pixel units coupled to the data line; and receiving, by a driver, the driving information; if the identifier of the at least one pixel unit includes an identifier of a pixel unit coupled to the driver, driving, by the driver, according to pixel data of the pixel unit coupled to the driver in the driving information, the pixel unit coupled to the driver to operate at a refresh frequency of the pixel unit coupled to the driver, and if the identifier of the at least one pixel unit does not include the identifier of the pixel unit coupled to the driver, driving, by the driver, the pixel unit coupled to the driver to maintain a currently displayed color at the refresh frequency of the pixel unit coupled to the driver.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
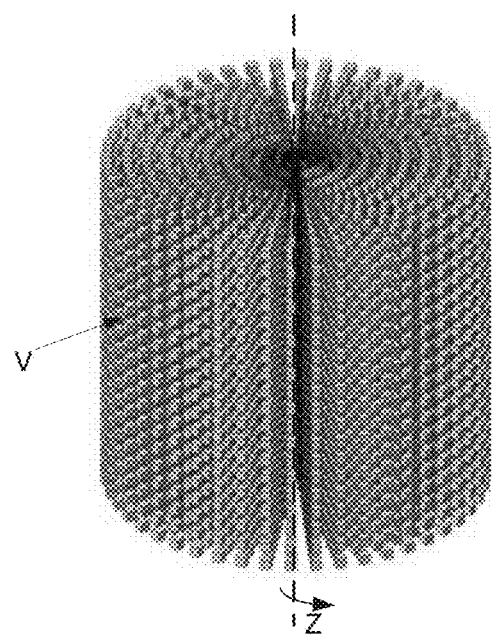
FIG. 1 is a perspective view showing a distribution of voxels of a rotating display apparatus in the related art.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also indicate that two or more components are not in 1s direct contact with each other, but still cooperate or interact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, depending on the context, the phrase "if it is determined that" or "if [a stated condition or event] is detected" is optionally construed as "in a case where it is determined that", "in response to determining that", "in a case where [the stated condition or event] is detected", or "in response to detecting [the stated condition or event]".

The phrase "applicable to" or "configured to" as used herein indicates an open and inclusive expression, which does not exclude devices that are applicable to or configured to perform additional tasks or steps.

Additionally, the phrase "based on" as used herein is meant to be open and inclusive, since a process, a step, a calculation or other action that is "based on" one or more of the stated conditions or values may, in practice, be based on additional conditions or values beyond those stated.

Technical terms used herein are schematically illustrated.

Stereoscopic frame: a pixel array of a rotating display apparatus makes one revolution to refresh a three-dimensional image, which is referred to as the stereoscopic frame.

Stereoscopic frame frequency: the number of stereoscopic frames refreshed by the rotating display apparatus in one second is referred to as the stereoscopic frame frequency. For example, the persistence-of-vision effect of human eyes requires that the stereoscopic frame frequency is not less than 24 Hz, and thus the rotating display apparatus needs to refresh at least twenty-four stereoscopic frames per second. That is, a rotating speed of the rotating display apparatus is not less than twenty-four revolutions per second (24 r/s).

In the first related art, a rotating display apparatus includes a display panel that rotates around a fixed rotation axis, and the display panel refreshes an image once (that is, the display panel displays a slice image, which is also referred to as an electronic frame) at each of different rotation angles during a rotation (i.e., a circle). In this way, with the rotation of the display panel and in combination with the persistence-of-vision effect of human eyes, the rotating display apparatus may display a three-dimensional image. Each pixel in the display panel rotates together with the display panel, and each pixel forms a voxel at a rotation angle where the display panel is located when the display panel refreshes the image each time. That is, during the rotation, the pixel forms a plurality of voxels.

FIG. 1 shows a distribution of voxels in a display process of the rotating display apparatus in the first related art. Referring to FIG. 1, a cube represents a voxel V. In the display panel, the farther the pixel from the rotation axis Z, the longer an arc drawn by the pixel during the rotation, so that the distribution of the voxels V of the rotating display apparatus in a display space is uneven, and there is a problem that voxels in the peripheral are sparse and voxels in the central are dense. The uneven distribution of the voxels further leads to uneven brightness of the displayed three-dimensional image. For example, a portion of the displayed three-dimensional image that is closer to the rotation axis has higher brightness, and a portion of the displayed three-dimensional image that is farther from the rotation axis has lower brightness.

In the second related art, a homogenization processing may be performed on a display content in advance by a software algorithm, and common processing methods includes a point cloud compression algorithm, such as an octree compression algorithm. For the display content processed by the software algorithm, a part of voxel data is discarded, so that the discarded voxel data is not displayed when the processed display content is displayed by the rotating display apparatus. In this case, corresponding voxels in the rotating display apparatus will not be lit up, which is equivalent to removing these voxels. For example, the closer to the rotation axis, the more voxels removed, which makes the overall brightness of the display content tend to be uniform.

Figure 2:
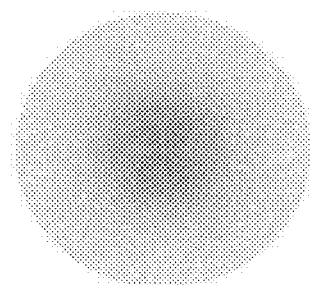
FIG. 2 is a top view showing a distribution of voxels of a rotating display apparatus in the related art.
Figure 2:
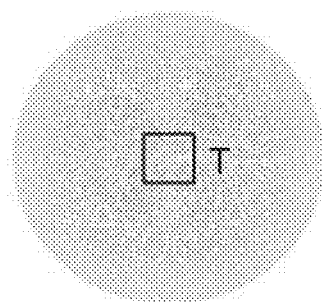
Figure 2:
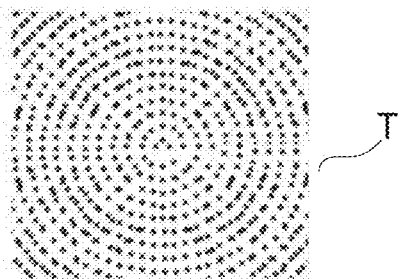

For example, in a rotating display apparatus, a resolution of a display panel is 120×200, a pixel pitch is 0.6 mm, and a single stereoscopic frame includes 374 electronic frames. In this case, a top view showing an effect of a distribution of voxels in the rotating display apparatus may refer to part (a) in FIG. 2, and if the point cloud compression is performed on a display content of the rotating display apparatus, a top view showing another effect of a distribution of voxels on a user's vision may refer to part (b) in FIG. 2. It can be seen that, when the display content that is processed by the point cloud compression algorithm for the homogenization processing is displayed, the uniformity of the overall brightness is significantly improved. However, the point cloud compression algorithm does not change positions of the voxels, but only discards some voxels from voxels at fixed positions shown in part (a) in FIG. 2 (that is, these voxels are not lit up). As a result, distances between some adjacent voxels of voxels that are lit up are small, and distances between some adjacent voxels of voxels that are lit up are large. That is, the distribution of the voxels is still uneven. A distribution of voxels in the T part in part (b) in FIG. 2 is enlarged and is shown in part (c) in FIG. 2, and the above-mentioned defects may be clearly seen from the enlarged view of the T part.

The embodiments of the present disclosure provide a rotating display apparatus, which provides a new idea for improving the problem that the distribution of the voxels is uneven in the rotation display process.

Figure 3:
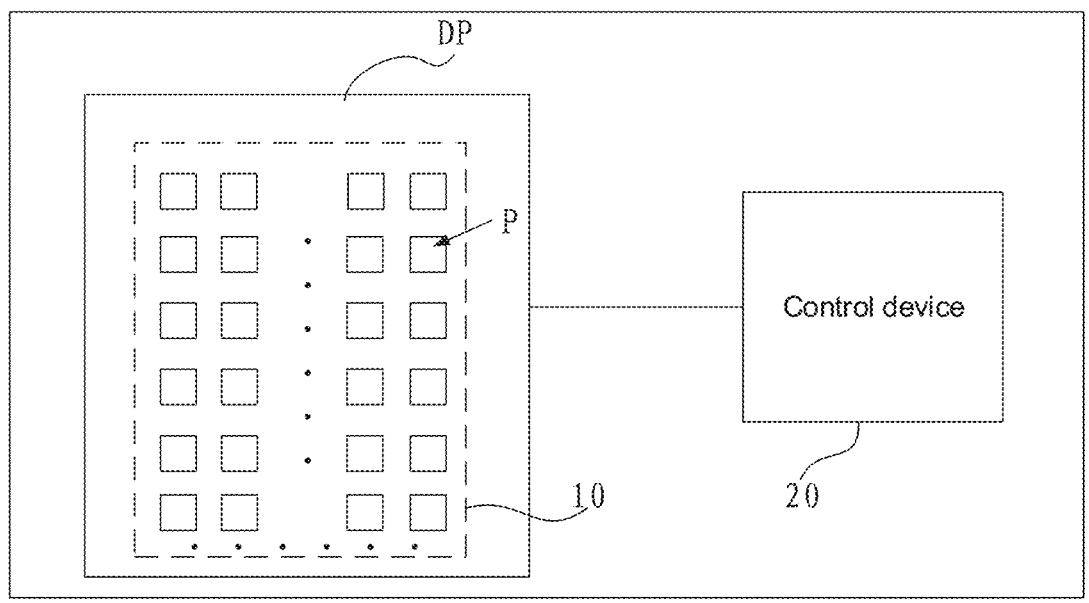
FIG. 3 is a structural diagram of a rotating display apparatus, in accordance with some embodiments of the present disclosure.

FIG. 3 shows a structure of the rotating display apparatus provided in the embodiments of the present disclosure. Referring to FIG. 3, the rotating display apparatus 1 is used for displaying three-dimensional images. The rotating display apparatus 1 includes a display panel DP, the display panel DP includes a pixel array 10, and the pixel array 10 includes a plurality of pixel units P (which is also referred to as pixels). Each pixel unit P in the pixel array 10 may be driven to operate according to a preconfigured refresh frequency. The rotating display apparatus 1 further includes a control device 20, and the control device 20 is configured to control each pixel unit P to operate according to a respective refresh frequency.

For example, the display panel DP may be a micro light-emitting diode (LED) display panel (including mini LEDs or micro LEDs), an organic light-emitting diode (OLED) display panel, or a quantum dot light-emitting diode (QLED) display panel. In the embodiments of the present disclosure, the micro LED display panel is taken as an example, and in this case, a single pixel unit P may include micro/mini LEDs for emitting different colors (e.g., three primary colors).

Figure 4:
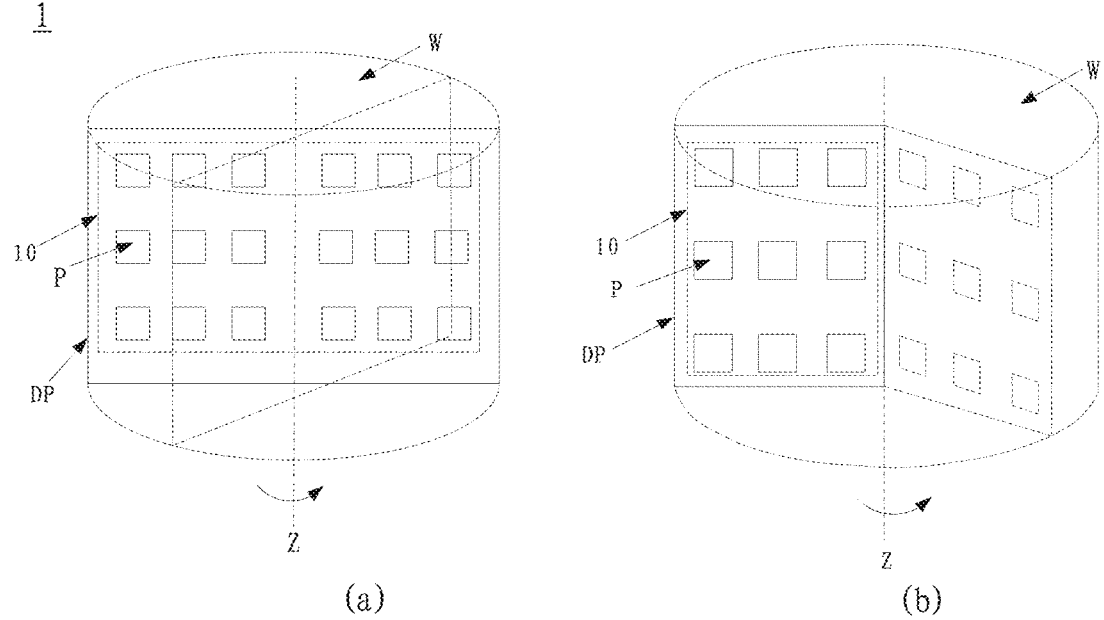
FIG. 4 is a schematic diagram showing a rotation of a pixel array in a rotating display apparatus, in accordance with some embodiments of the present disclosure.

Referring to FIG. 4, the pixel array 10 may rotate around a rotation axis Z located in the pixel array 10. If the pixel array 10 does not rotate, the rotating display apparatus 1 may display a two-dimensional image. The rotation axis Z refers to any axis located in the pixel array 10. For example, referring to part (b) in FIG. 4, when the pixel array 10 rotates to display a three-dimensional image, the rotation axis Z thereof may be located on a side of the pixel array 10. Hereinafter, for the convenience of description, a rotating display apparatus whose rotation axis Z is located on a side of the pixel array is referred to as a first rotating display apparatus. As another example, referring to part (a) in FIG. 4, the rotation axis Z is located in a center of the pixel array 10. For example, the rotation axis Z is a symmetry axis of the pixel array 10. Hereinafter, for the convenience of description, a rotating display apparatus whose rotation axis Z is located in the center of the pixel array is referred to as a second rotating display apparatus. When the pixel array 10 rotates around the rotation axis Z, each pixel unit P in the pixel array 10 also rotates around the rotation axis Z.

For example, the display panel DP including the pixel array may be rotatable. For example, the display panel DP is fixed on a rotating shaft in the rotating display apparatus 1, and is driven to rotate through rotation of the rotating shaft. Referring to FIG. 4, when the pixel array 10 in the display panel DP rotates periodically around the rotation axis Z (i.e., an extension line of the rotating shaft), a cylindrical display space W may be formed in the space; and in this case, by controlling the display panel DP to display specific images and controlling the transformation of the images, a static or dynamic three-dimensional image may be displayed in the cylindrical display space W.

Referring to FIG. 4, in a case where the display space W is constant, a size of a region where the pixel array of the second rotating display apparatus (shown in part (a) in FIG. 4) is located is larger than that of a region where the first rotating display apparatus (shown in part (b) in FIG. 4) is located. That is, in the case where the display space W is constant, the second rotating display apparatus includes more pixel units than the first rotating display apparatus. For example, the number of pixel units of the second rotating display apparatus is twice that of the first rotating display apparatus. The larger a size of a region where the pixel array in the rotating display apparatus is located, the more the display content of the rotating display apparatus. In the case where the display space W is constant, the display content of the second rotating display apparatus is equivalent to twice that of the first rotating display apparatus. Therefore, in a single stereoscopic frame, when the same three-dimensional image is displayed, the first rotating display apparatus refreshes more images than the second rotating display apparatus. That is, the first rotating display apparatus requires a higher refresh frequency.

Figure 5A:
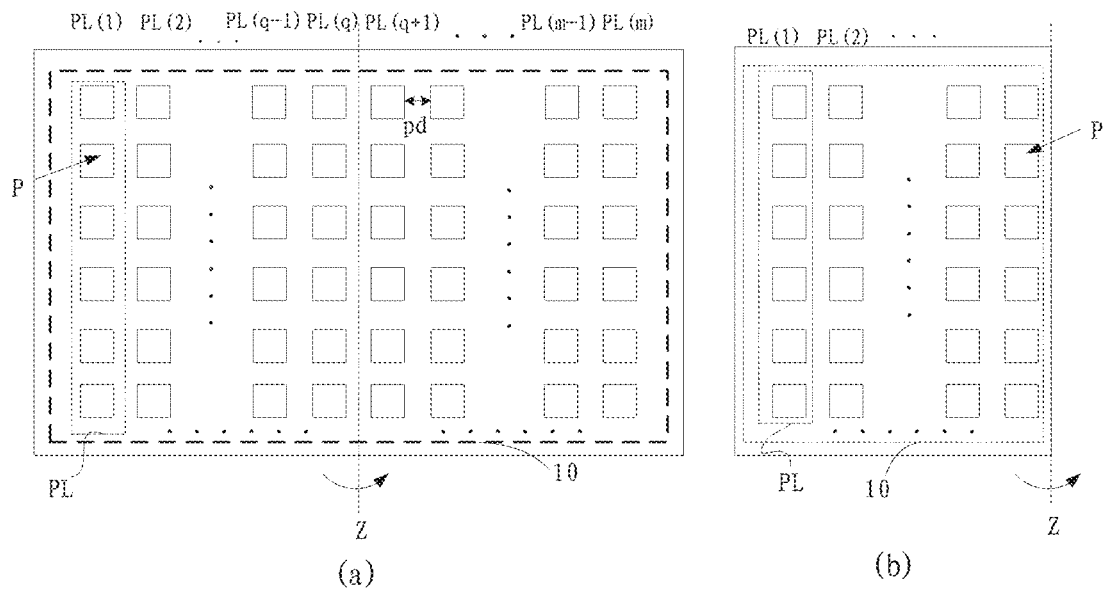
FIG. 5A is a structural diagram of a display panel, in accordance with some embodiments of the present disclosure.

For example, referring to FIG. 5A, a resolution of the display panel DP in the rotating display apparatus is m×n; where m is a resolution of transverse direction, the term "transverse direction" refers to a direction perpendicular to the rotation axis Z, and m is the number of pixels in a row of pixel units P extending in the transverse direction in the pixel array 10; n is a resolution of longitudinal direction, the term "longitudinal direction" refers to a direction parallel to the rotation axis Z, and n is the number of pixels in a column of pixel units P extending in the longitudinal direction in the pixel array 10. When the pixel array 10 rotates around the rotation axis Z, the pixel units P in the pixel array 10 rotate together with the pixel array 10. In this way, as each pixel unit P is continuously lit up during the rotation, voxels may be formed in the display space. Here, m may be an even number, and in this case, the rotation axis Z is located between two most central columns of pixel units. That is, the rotation axis Z is located between a (m/2)-th column of pixel units and a (m/2+1)-th column of pixel units. Alternatively, m may be an odd number, and in this case, the rotation axis Z passes through the most central column of pixel units. That is, the rotation axis Z passes through a [(m+1)/2]-th column of pixel units.

Figure 5B:
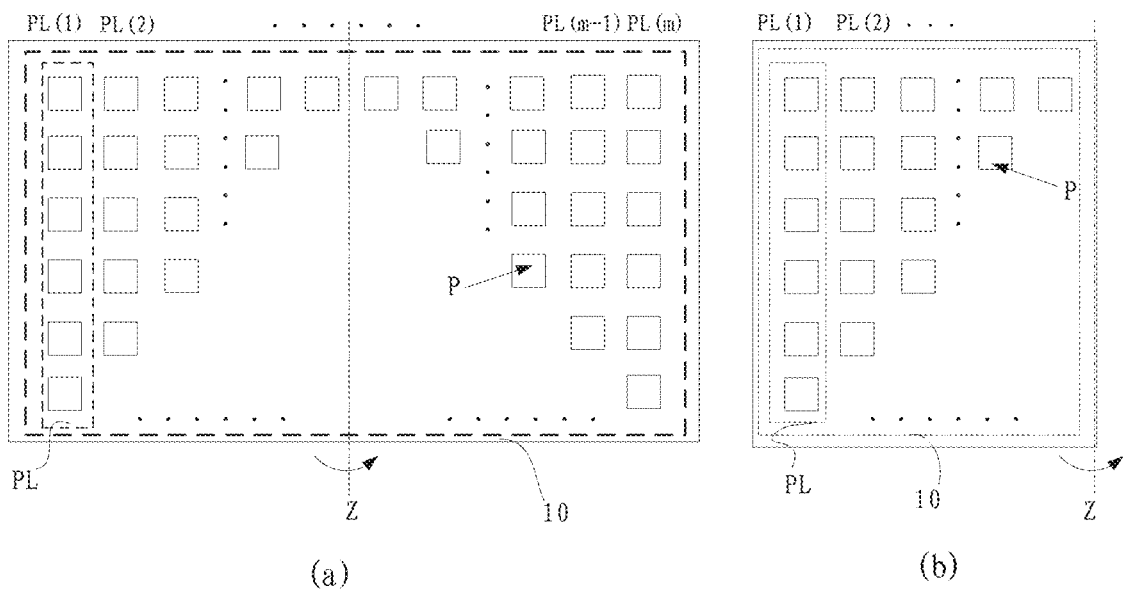
FIG. 5B is a structural diagram of another display panel, in accordance with some embodiments of the present disclosure.

FIGS. 5A and 5B each show a distribution of the pixel array of the rotating display apparatus. For example, in both part (a) in FIG. 5A and part (a) in FIG. 5B, the rotation axis Z of the pixel array 10 is located in the center of the pixel array 10 (i.e., the rotating display apparatus being the second rotating display apparatus). As another example, in both part (b) in FIG. 5A and part (b) in FIG. 5B, the rotation axis Z of the pixel array 10 is located on the side of the pixel array 10 (i.e., the rotating display apparatus being the first rotating display apparatus). The pixel array 10 includes the plurality of pixel units P, the plurality of pixel units P are arranged in a plurality of pixel columns PL distributed in the direction perpendicular to the rotation axis Z, and pixel units P in each pixel column PL are arranged in the direction parallel to the rotation axis Z and operate at the same refresh frequency.

For example, a single pixel unit P includes three sub-pixels of different colors. For example, the single pixel unit includes three light-emitting devices, and the three light-emitting devices respectively emit light of three primary colors, such as red (R) light, green (G) light and blue (B) light. Thus, the single pixel unit may generate light of a plurality of colors by fusing light of different brightness emitted by the sub-pixels. As another example, the single pixel unit includes three light-emitting devices, each light-emitting device emits white light, and the three light-emitting devices respectively correspond to a red (R) filter, a green (G) filter and a blue (B) filter. Thus, the single pixel unit P may generate light of a plurality of colors by controlling brightness of the white light emitted by the light-emitting devices. The light-emitting device may be a light-emitting diode, such as a micro LED, an OLED or a QLED.

It is worth noting that, the plurality of pixel units P constituting the plurality of pixel columns PL in the pixel array 10 may be all of the pixel units P in the pixel array 10. Of course, the plurality of pixel units P constituting the plurality of pixel columns PL in the pixel array 10 may be only some of the pixel units P in the pixel array 10. In the embodiments of the present disclosure, in an example where the pixel units P constituting the plurality of pixel columns PL are all of the pixel units P in the pixel array 10, the plurality of pixel columns arranged in the direction perpendicular to the rotation axis Z are sequentially named as PL(1), PL(2), PL(3) . . . PL(j) . . . PL(m), where PL(j) is any pixel column of PL(1) to PL(m).

For example, referring to FIG. 5A, the number of pixel units P included in each pixel column PL may be the same. For example, the pixel units P are also arranged in the same interval, so that the plurality of pixel units P in the pixel array 10 are arranged in a matrix. As another example, referring to FIG. 5B, the numbers of pixel units P included in different pixel columns PL may be not all the same. For example, the plurality of pixel units P in the pixel array 10 are arranged in a triangular matrix.

Each pixel unit P in the pixel array 10 operates at a certain refresh frequency. For example, each pixel unit emits light (i.e., being lit up) at a certain refresh frequency, and the refresh frequency thereof is a frequency at which the pixel unit is driven to be lit up. In the embodiments of the present disclosure, for a single pixel column PL, the pixel units P included therein operate at the same refresh frequency. That is, the pixel units in the pixel column are lit up at the same frequency. Thus, the pixel column PL may perform display at the refresh frequency, and a content displayed by the pixel column PL is a portion of a displayed image.

It is worth noting that, pixel data used for driving a pixel unit may include gray scales of the sub-pixels in the pixel unit. For example, the pixel unit includes a red (R) sub-pixel, a green (G) sub-pixel and a blue (B) sub-pixel, and a value of the gray scale of each sub-pixel is in a range from 0 to 255, inclusive. When the gray scales of the three sub-pixels are all 0 (that is, R is equal to 0, G is equal to 0, and B is equal to 0 (R=0, G=0, and B=0)), it means that a corresponding color to be displayed by the pixel unit is a black color. Even if a certain pixel unit P displays the black color for a period of time, the pixel unit P may also operate at its corresponding refresh frequency. That is, the pixel unit P may be driven by the pixel data (R=0, G=0, and B=0) at its corresponding refresh frequency. Every time it is driven, it is refreshed once, which may also be referred to as being lit up once, but a color of light emitted by the pixel unit P is a pure black color.

In the embodiments of the present disclosure, the control device 20 is configured to control the pixel units P in each pixel column PL to operate at a refresh frequency corresponding to the pixel column PL.

Referring to FIG. 5A, in the pixel array 10, a refresh frequency of pixel units in a pixel column close to the rotation axis Z is less than (i.e., lower than) a refresh frequency of pixel units in a pixel column far away from the rotation axis Z. That is, the pixel array 10 includes at least two pixel columns with different distances to the rotation axis Z, and refresh frequencies of the two pixel columns are different. A magnitude of the refresh frequency is also referred to as a level of the refresh frequency. For example, if the refresh frequency of a pixel unit increases, it means that the refresh frequency of the pixel unit rises.

In other words, the pixel array 10 includes a first pixel column and a second pixel column; a distance between the first pixel column and the rotation axis Z is greater than a distance between the second pixel column and the rotation axis Z, and a refresh frequency of pixel units in the first pixel column is greater than (i.e., higher than) a refresh frequency of pixel units in the second pixel column. The first pixel column and the second pixel column are located on the same side of the rotation axis Z, or the first pixel column and the second pixel column are located on different sides of the rotation axis Z. The first pixel column and the second pixel column may be any two pixel columns of the pixel array 10. For example, the first pixel column is a pixel column PL(j−1), and the second pixel column is a pixel column PL(j).

Figure 6:
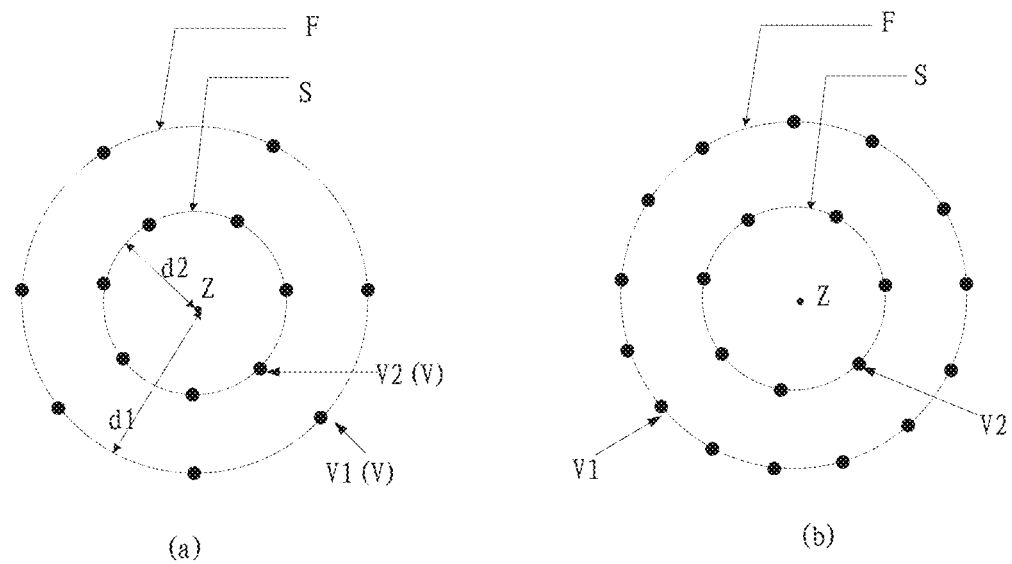
FIG. 6 is a top view showing distributions of voxels of two pixel columns in a pixel array, in accordance with some embodiments of the present disclosure.

For example, referring to FIG. 6, part (a) and part (b) in FIG. 6 show two types of distributions of voxels of the two pixel columns (PL(j−1) and PL(j)) in FIG. 5A in a single stereoscopic frame. The distance between the first pixel column F (e.g., the pixel column PL(j−1)) and the rotational axis Z is d1, the distance between the second pixel column S (e.g., the pixel column PL(j)) and the rotational axis Z is d2, and d1 is greater than d2 (d1>d2). During a display process, a pixel unit in the first pixel column F makes one revolution to form a plurality of first voxels V1, and a pixel unit in the second pixel column S makes one revolution to form a plurality of second voxels V2. Part (a) in FIG. 6 shows a distribution of the voxels in a case where the refresh frequency of the pixel unit in the first pixel column F is equal to the refresh frequency of the pixel unit in the second pixel column S. For example, each pixel unit in the first pixel column F and the second pixel column S is lit up seven times per revolution. That is, in a case where the stereoscopic frame frequency is 24 Hz, the refresh frequency of each pixel unit in the first pixel column F and the second pixel column S is 168 Hz (i.e., 24×7). Thus, the pixel unit in the first pixel column F may form seven first voxels V1 during a single revolution, and the pixel unit in the second pixel column S may form seven second voxels V2 in the single revolution. Part (b) in FIG. 6 shows a distribution of the voxels in a case where the refresh frequency of the pixel unit in the first pixel column F is higher than the refresh frequency of the pixel unit in the second pixel column S. For example, each pixel unit in the first pixel column F is lit up fourteen times per revolution, and each pixel unit in the second pixel column S is lit up seven times per revolution. That is, in the case where the stereoscopic frame frequency is 24 HZ, the refresh frequency of the pixel unit in the first pixel column F is 336 Hz (i.e., 14×24), and the refresh frequency of the pixel unit in the second pixel column S is 168 Hz (i.e., 24×7). Thus, the pixel unit in the first pixel column F may form fourteen first voxels V1 in the single revolution, and the pixel unit in the second pixel column S may form seven second voxels V2 in the single revolution. It can be clearly seen from the accompanying drawings that, in the case where the refresh frequency of the pixel unit in the first pixel column F is equal to the refresh frequency of the pixel unit in the second pixel column S (e.g., both of which are 168 Hz), among the first voxels V1 formed by the pixel unit in the first pixel column F, a distance between two adjacent first voxels V1 is large; and among the second voxels V2 formed by the pixel unit in the second pixel column S, a distance between two adjacent second voxels V2 is small. That is, a first voxel distance is greater than a second voxel distance. The first voxel distance is the distance between the two adjacent first voxels V1 (that is, an arc length between the two adjacent first voxels V1), and the second voxel distance is the distance between the two adjacent second voxels V2 (that is, an arc length between the two adjacent second voxels V2). Therefore, the distribution of the voxels formed by the two pixel columns is uneven. In the case where the refresh frequency of the pixel unit in the first pixel column F is doubled (from 168 Hz to 336 Hz), the number of first voxels V1 formed by the pixel unit in the first pixel column F in a single stereoscopic frame is also doubled, and the distance between the two adjacent first voxels V1 is reduced. Thus, compared with a situation where the refresh frequency of the pixel unit in the first pixel column F is not increased, the first voxel distance is closer to the second voxel distance, so that the distribution of the voxels formed by the pixel units in the first pixel column F and the second pixel column S is more even in a circumferential direction.

In some embodiments, the first voxel distance is equal to the second voxel distance. In the case where the first voxel distance is equal to the second voxel distance, the voxels (including the first voxels V1 and the second voxels V2) formed by the first pixel column F and the second pixel column S are completely even in the circumferential direction.

In the rotating display apparatus of the first related art, when the pixel array is rotated by a certain angle, the farther a pixel column from the rotation axis, the longer an arc drawn by the pixel column, and the longer a path drawn by each pixel unit included in the pixel column, so that a space swept by each pixel unit in the pixel column is larger during the display process. However, the number of photons generated by a pixel unit when it is refreshed once is constant, and thus a photon density corresponding to the large space is low, which is macroscopically embodied as low brightness. That is, in the rotating display apparatus, the farther a pixel unit from the rotation axis, the lower brightness generated thereby. In the rotating display apparatus provided in the embodiments of the present disclosure, a pixel column far away from the rotation axis in the pixel array has a higher refresh frequency than a pixel column close to the rotation axis. That is, the number of photons generated by a pixel unit in the pixel column faraway from the rotation axis Z per unit time is greater. As a result, a photon density of the pixel column far away from the rotation axis Z may be increased, so as to improve the display brightness of the pixel column far away from the rotation axis.

Since refresh frequencies of pixel units in the pixel column are equal, for the convenience of description below, the refresh frequency of the pixel unit in the pixel column may be referred to as a refresh frequency of the pixel column.

For example, in the pixel array 10, two pixel columns of the plurality of pixel columns are the first pixel column and the second pixel column. For example, referring to FIG. 5A, the first pixel column is a pixel column PL(1) or PL(m) farthest from the rotation axis Z in the plurality of pixel columns, and the second pixel column is any pixel column located between the rotation axis Z and the first pixel column in the plurality of pixel columns, such as a pixel column PL(2). As another example, the two pixel columns are two adjacent pixel columns, such as PL(1) and PL(2); the pixel column PL(1) farther from the rotation axis Z is the first pixel column, and the pixel column PL(2) is the second pixel column.

As another example, in some pixel columns of the plurality of pixel columns in the pixel array 10, every two adjacent pixel columns are the first pixel column and the second pixel column, one pixel column farther from the rotation axis Z is the first pixel column, and the other pixel column is the second pixel column. For example, referring to part (a) in FIG. 5A, the some pixel columns are pixel columns PL(1) to PL(3) that are continuously distributed and located on the same side of the rotation axis Z; in a direction away from the rotation axis Z, refresh frequencies of the pixel columns PL(3) to PL(1) increase (i.e., rise) sequentially. The pixel column PL(1) is the first pixel column relative to the pixel column PL(2), and the pixel column PL(2) is the first pixel column relative to the pixel column PL(3). Refresh frequencies of other pixel columns (e.g., pixel columns PL(4) to PL(j)) may be equal to or different from one another; a refresh frequency of the pixel column PL(4) may be equal to or lower than a refresh frequency of the pixel column PL(3). In addition, the some pixel columns may also be pixel columns located on different sides of the rotation axis Z. For example, referring to part (a) in FIG. 5A, the some pixel columns are pixel columns PL(2) to PL(q+1).

As yet another example, among the plurality of pixel columns, every two adjacent pixel columns are the first pixel column and the second pixel column; one pixel column farther from the rotation axis Z is the first pixel column, and the other pixel column is the second pixel column. For example, referring to part (a) in FIG. 5A, in pixel columns PL(1) to PL(q) (or pixel columns PL(q+1) to PL(m)) located on the same side of the rotation axis Z, refresh frequencies of these pixel columns increase sequentially in the direction away from the rotation axis Z.

In the above embodiments, since the refresh frequency of the pixel column far away from the rotation axis is higher than that of the pixel column close to the rotation axis, the pixel unit in the pixel column far away from the rotation axis is lit up more times per unit time than the pixel unit in the pixel column close to the rotation axis. In the rotating display apparatus, a pixel unit may form a voxel every time it is lit up, and when the pixel array is rotated by a certain angle, the longer the arc drawn by the pixel column, the more times the pixel column is lit up (that is, the more voxels are formed). Therefore, the number of voxels formed by the pixel unit located in a column within a unit arc length is closer to the number of voxels formed by the pixel unit located in a different pixel column within the unit arc length. In this way, the pixel array is continuously rotated, and combined with an adjustment of the refresh frequencies of the pixel columns, the distribution of the voxels of the rotating display apparatus may be controlled to be even during the display process.

In the embodiments of the present disclosure, the pixel units in the pixel column may be controlled to operate at the same refresh frequency by the control device, and the refresh frequency of each pixel unit in the pixel column far away from the rotation axis in the pixel array is controlled to be greater than the refresh frequency of each pixel unit in the pixel column close to the rotation axis in the pixel array, so that the pixel column far away from the rotation axis is lit up more times per unit time than the pixel column close to the rotation axis. In this way, when the pixel array is rotated by a certain angle, the pixel column close to the rotation axis draws an arc with a short length and forms less voxels, and the pixel column far away from the rotation axis draws an arc with a long length and forms more voxels, which may improve a problem of an uneven distribution of voxels due to a fact that the distances between the two pixel columns from the rotation axis are different and the lengths of the arcs drawn by the two pixel columns are different. As a result, it is beneficial to improve a problem of uneven brightness of the image displayed by the rotating display apparatus.

In some embodiments, referring to FIGS. 7A to 7D, the plurality of pixel columns in the pixel array 10 are divided into a plurality of pixel groups GP(1) to GP(M). Each pixel group (which is any of the pixel groups GP(1) to GP(M)) includes at least one pixel column distributed continuously. That is, each pixel group includes a single pixel column, or pixel columns distributed continuously. Refresh frequencies of all pixel units P in the pixel group are the same. In pixel columns located on the same side of the rotation axis Z, refresh frequencies of pixel groups arranged in the direction away from the rotation axis Z gradually increase.

Figure 7A:
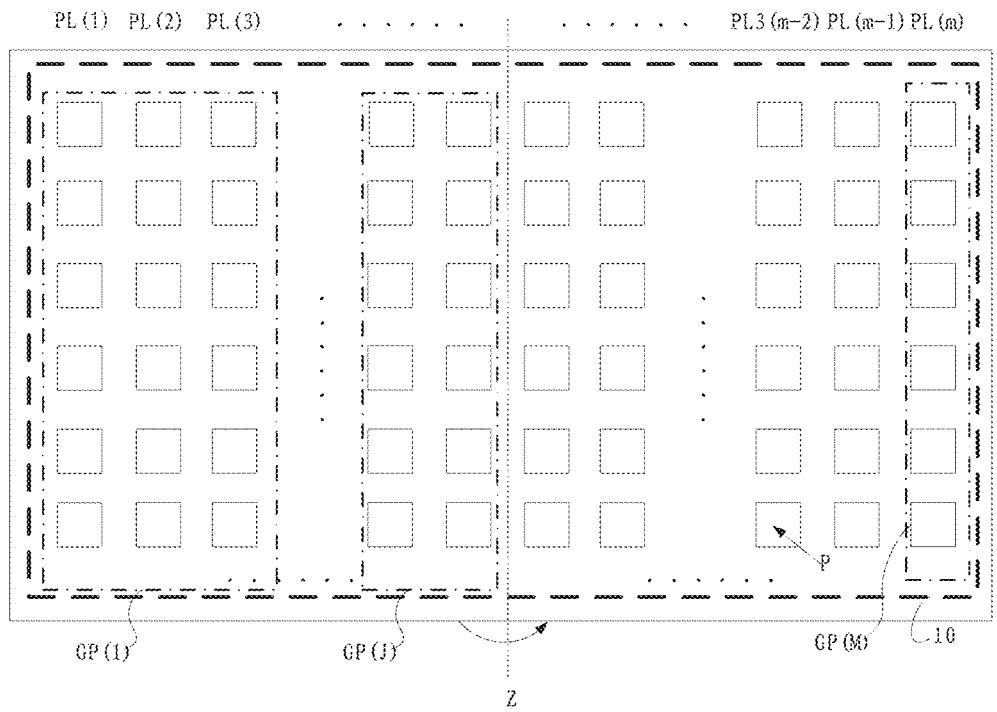
FIGS. 7A to 7D are structural diagrams of some display panels, in accordance with some embodiments of the present disclosure.
Figure 7B:
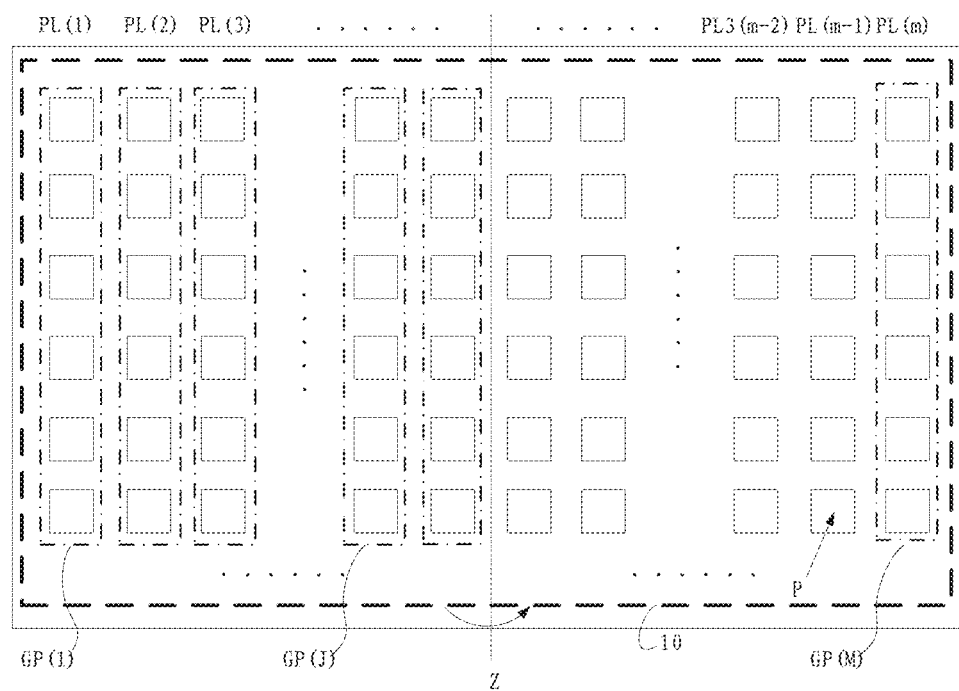
Figure 7C:
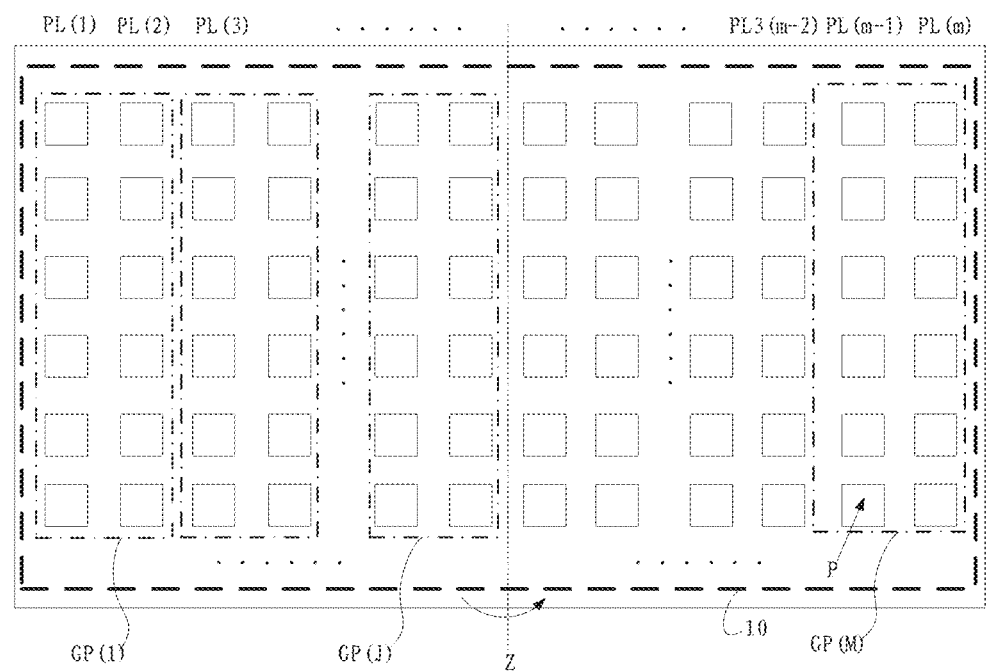

Referring to FIG. 7C, the pixel group may include one or more pixel columns. In a case where the pixel group includes pixel columns, the number of pixel columns included in each of some pixel groups may be the same. For example, each pixel group in GP(1) to GP(M) includes two pixel columns. The number of pixel columns included in each pixel group may be designed according to needs. For example, a pixel group includes three pixel columns, five pixel columns or ten pixel columns, etc. In addition, in the case where the pixel group includes the pixel columns, the numbers of pixel columns included in different pixel groups may be different. For example, referring to FIG. 7A, a pixel group GP(J) close to the rotation axis Z includes two pixel columns, and a pixel group GP(1) farthest from the rotation axis Z includes three pixel columns. The number of pixel columns included in each pixel group may also be designed according to needs.

The plurality of pixel columns in the pixel array are divided into groups, and the refresh frequencies of the pixel groups located on the same side of the rotation axis gradually increase in the direction away from the rotation axis, so that the refresh frequency of the pixel group far away from the rotation axis in the pixel array is higher than that of the pixel group proximate to the rotation axis in the pixel array. Thus, the pixel array will show a trend that the refresh frequencies thereof gradually increase in the direction away from the rotation axis in units of pixel groups. In this way, the distribution of the voxels of the rotating display apparatus may be gradually even in the units of pixel groups, which optimizes the uniformity of the distribution of the voxels to a certain extent.

For example, referring to FIG. 7B, a pixel group may include only one pixel column. In the case where the pixel group includes only one pixel column, the refresh frequencies of the pixel columns located on the same side of the rotation axis Z gradually increase in the direction away from the rotation axis Z.

In the case where the pixel group includes the pixel columns, since the refresh frequencies of the pixel units in the same pixel group are the same, it is not necessary for the control device to change the refresh frequencies of all pixel columns one by one, but to control the pixel columns at a single refresh frequency simultaneously, thereby simplifying the control method.

It is worth noting that, in the second rotating display apparatus, grouping manners of pixel columns located on different sides of the rotation axis may be different. For example, in the pixel groups located on one side of the rotation axis, the number of pixel columns included in each of the pixel groups is the same; and in the pixel groups located on the other side of the rotation axis, the number of pixel columns included in each of some pixel groups is different. As another example, in the pixel groups located on one side of the rotation axis, the number of pixel columns included in each of the pixel groups is the same; and in the pixel groups located on the other side of the rotation axis, the number of pixel columns included in each of the pixel groups is also the same, but the number of pixel columns included in each of two pixel groups located on different sides of the rotation axis is different.

In addition, the refresh frequencies of the pixel groups located on the same side of the rotation axis and arranged in the direction away from the rotation axis may also increase according to a certain rule. For example, the refresh frequencies of the pixel groups arranged in the direction away from the rotation axis gradually increase in an equal proportion. For example, a difference between refresh frequencies of every two adjacent pixel groups is equal. Alternatively, the refresh frequencies of the pixel groups arranged in the direction away from the rotation axis gradually increases by a factor. For example, a ratio of the refresh frequencies of every two adjacent pixel groups is equal.

In the pixel columns located on the same side of the rotation axis, the refresh frequencies of the pixel groups arranged in the direction away from the rotation axis gradually increase, which not only improves the uniformity of the distribution of the voxels in the units of pixel groups, but also considers a difficulty that the control device controls the pixel columns at different refresh frequencies. As a result, it is beneficial to reduce the power consumption of the control device.

Figure 7D:
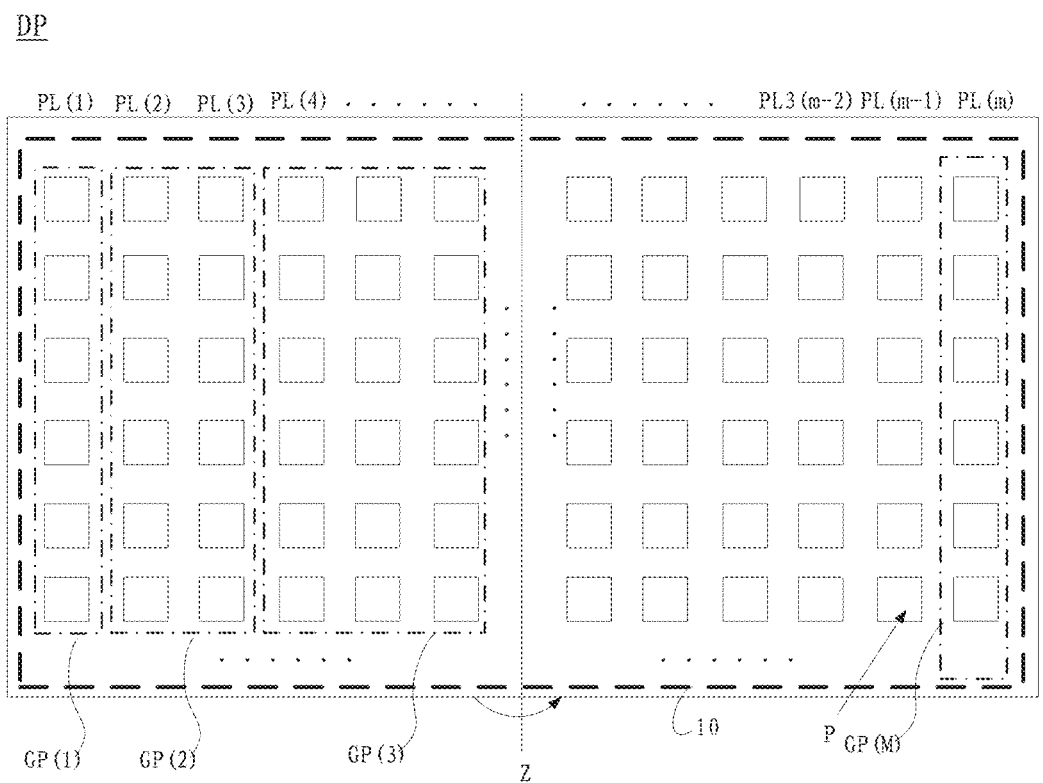

In some embodiments, referring to FIG. 7D, in the plurality of pixel groups GP(1) to GP(M), in a case where the number of pixel columns included in each of some pixel groups is different, the specific number of pixel columns included in each pixel group may also be changed according to a certain rule. For example, the numbers of pixel columns included in pixel groups arranged in the direction away from the rotation axis Z sequentially decrease. For example, in pixel groups GP(3) to GP(1), the number of pixel columns included in the pixel group GP(3) is greater than the number of pixel columns included in the pixel group GP(2), and the number of pixel columns included in the pixel group GP(2) is greater than the number of pixel columns included in the pixel group GP(1).

For example, in the plurality of pixel groups and in the pixel columns located on the same side of the rotation axis Z, the numbers of pixel columns included in the pixel groups arranged in the direction away from the rotation axis Z decrease in an equal difference. For example, the pixel group GP(3) includes three pixel columns, the pixel group GP(2) includes two pixel columns, and the pixel group GP(1) includes one pixel column.

The pixel column close to the rotation axis usually needs to be refreshed at a low frequency, and the pixel column far away from the rotation axis needs to be refreshed at a high frequency, which makes the distribution of the voxels more even; and the less the number of pixel columns refreshed at the high frequency, the better it is to reduce the overall power consumption. Therefore, by controlling the numbers of pixel columns included in the pixel groups arranged in the direction away from the rotation axis in the pixel array to decrease sequentially, the power consumption may be effectively reduced on the basis of optimizing the uniformity of the distribution of the voxels in the rotating display apparatus.

In some embodiments, referring to FIGS. 7A to 7D, the rotation axis Z of the rotating display apparatus is a symmetry axis of the pixel array 10, and refresh frequencies of two pixel columns that are respectively located on different sides of the rotation axis Z and have the same distance to the rotation axis Z are the same. That is to say, for the second rotating display apparatus, refresh frequencies of pixel columns respectively located on both sides of the rotation axis Z are symmetrical about the rotation axis Z.

For example, referring to FIG. 7B, the numbers of pixel groups located on both sides of the rotation axis Z are the same, and the number of pixel columns included in each pixel group is the same. For example, each pixel group includes one pixel column, and the refresh frequencies of pixel groups located on the same side of the rotation axis Z increase sequentially in the direction away from the rotation axis Z. For example, the stereoscopic frame frequency is 24 Hz, and in the direction away from the rotation axis Z, the refresh frequencies of the pixel groups sequentially are 168 Hz, 336 Hz, 504 Hz, etc. Thus, in the second rotating display apparatus, refresh frequencies of pixel columns located in the center and continuously distributed are the smallest. For example, refresh frequencies of four pixel columns located in the center of the pixel array 10 and continuously distributed are the smallest, all of which are 168 Hz.

Figure 8A:
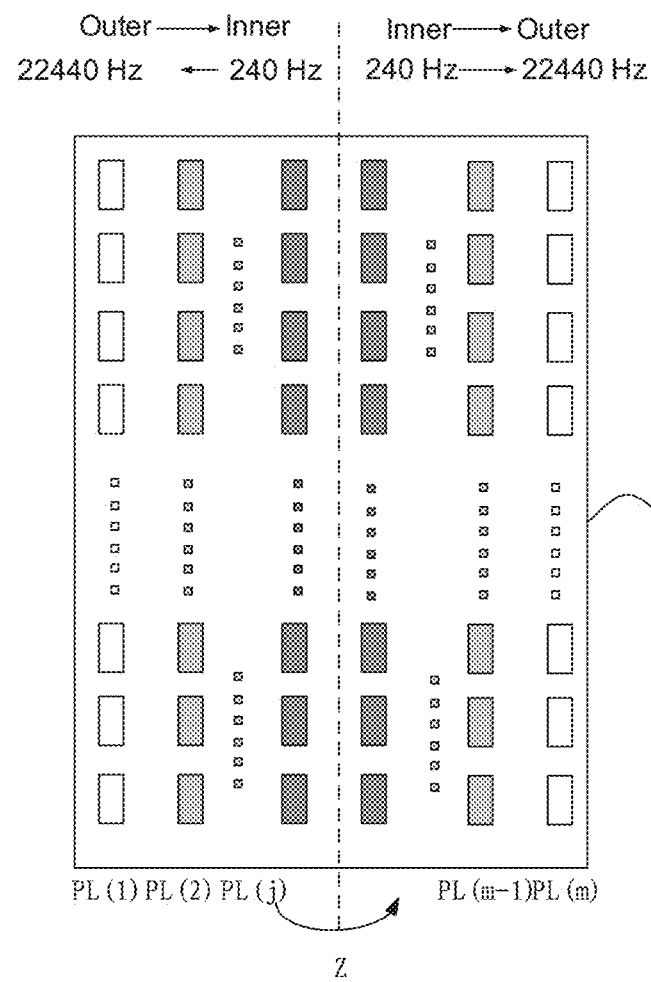
FIG. 8A is a structural diagram of yet another display panel, in accordance with some embodiments of the present disclosure.

In some embodiments, referring to FIG. 8A, in the direction away from the rotation axis Z, the refresh frequencies of the pixel groups located on the same side of the rotation axis Z constitutes an arithmetic progression. That is, the refresh frequencies of the pixel groups located on the same side of the rotation axis Z gradually increase with a certain tolerance, and a difference of refresh frequencies of two adjacent pixels is equal. For example, each pixel group in the pixel array 10 includes only one pixel column PL. In the case where each pixel group in the pixel array 10 includes only one pixel column and refresh frequencies of pixel columns having the same distance to the rotation axis Z are the same, the refresh frequency of each pixel column PL may be calculated in the following manner.

The pixel column PL(j) is taken as an example, PL(j) represents any of the pixel columns in the pixel array 10, and j is equal to a value among 1, 2, . . . , m (j=1, 2, . . . m). Firstly, a rotation radius R corresponding to the pixel column PL(j) is calculated according to formula 1. The formula 1 is $R=|[m/2-(j-1)]*pd-pd/2|$, where m is the total number of pixel columns in the pixel array 10, and j is a serial number of the pixel column where the pixel column PL(j) is located. For example, referring to FIG. 5A, in the first rotating display apparatus, the pixel columns are numbered 1, 2, 3 . . . m in sequence in a direction from the pixel column farthest from the rotation axis Z to the pixel column closest to the rotation axis Z; in the second rotating display apparatus, the pixel columns are numbered 1, 2, 3 . . . m in sequence from one side of the pixel array 10 to the other side of the pixel array 10. In addition, pd is a distance between two adjacent pixel units in the pixel array in the direction perpendicular to the rotation axis Z, which may be referred to as a pixel interval or a pixel pitch.

Secondly, the number of times that the pixel column PL(j) needs to be refreshed in a single stereoscopic frame is calculated according to formula 2. The formula 2 is $Se=Ceil(2*\pi/\Phi)$, where $\Phi=pd/R$, $\Phi$ represents an angle that the pixel unit in the pixel column PL(j) rotates between two adjacent lightings, and Ceil( ) is a ceiling function. In this way, voxel pitches of voxels formed by the pixel unit in the pixel column PL(j) are equal to the pd.

Then, the refresh frequency of the pixel column PL(j) is calculated according to formula 3. The formula 3 is $fj=Se*F$, where F represents the stereoscopic frame frequency of the rotating display apparatus.

Figure 8B:
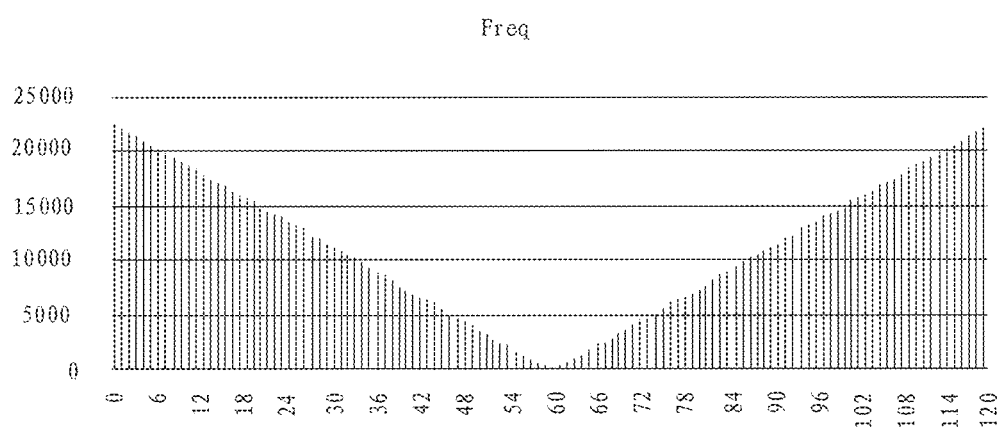
FIG. 8B is a distribution diagram of refresh frequencies of pixel columns of a pixel array in the display panel shown in FIG. 8A.

For example, referring to FIG. 8A, in the pixel array 10, n is equal to 200, m is equal to 120 (n=200, and m=120), each pixel group includes only one pixel column, and the refresh frequencies of the pixel columns calculated through the above manner may be seen in FIG. 8B. It can be seen from the figure that, the refresh frequencies of the pixel columns are distributed in a shape of two triangles symmetrical about the rotation axis as a whole, and refresh frequencies of two pixel columns PL (60) and PL(61) respectively located on both sides of the rotation axis Z and closest to the rotation axis are the smallest, which are 240 HZ; in the direction away from the rotation axis, the refresh frequencies of the pixel columns located on any of the both sides of the rotation axis gradually increase with the same tolerance, so that refresh frequencies of two outermost pixel columns in the pixel array may be the maximum. For example, the refresh frequencies of pixel columns PL(1) and PL(120) may be 22440 Hz.

In a case where the refresh frequencies of the pixel columns respectively located on both sides of the rotation axis in the second rotating display apparatus are not symmetrical about the rotation axis, the refresh frequencies of the pixel columns having the same distance to the rotation axis and respectively located on both sides of the rotation axis are different. Since different refresh frequencies form different numbers of voxels, in a single stereoscopic frame of the second rotating display apparatus, portions of the display space having the same distance to the rotation axis have different brightness, and the displayed three-dimensional image has uneven brightness. Therefore, in the second rotating display apparatus, the refresh frequencies of the pixel columns respectively located on both sides of the rotation axis are set to be symmetrical about the rotation axis, thereby improving the problem of uneven brightness of the three-dimensional image.

Figure 9:
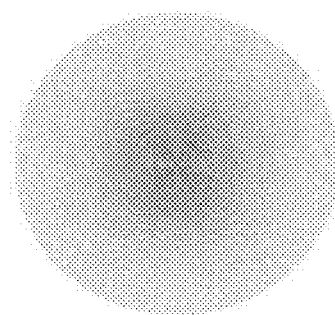
FIG. 9 is a top view showing a distribution of voxels of a rotating display apparatus, in accordance with some embodiments of the present disclosure.
Figure 9:
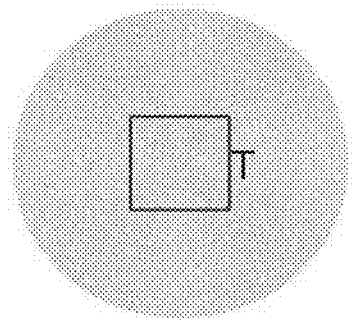
Figure 9:
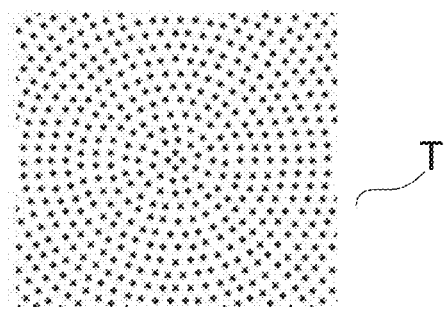

Referring to FIG. 9, FIG. 9 shows distributions of the voxels of the pixel array 10 in FIG. 8A before and after being optimized according to the distribution of frequencies shown in FIG. 8B. Part (a) in FIG. 9 shows the distribution of the voxels before being optimized, part (b) in FIG. 9 shows the distribution of the voxels after being optimized, and part (c) in FIG. 9 is an enlarged view of the T part of part (b) in FIG. 9. It can be seen from part (c) in FIG. 9 that, compared with the distribution of the voxels (part (c) in FIG. 2) after the homogenization by a software in the second related art, the distribution of the voxels (part (c) in FIG. 9) of the rotating display apparatus after the adjustment and the optimization of the refresh frequency is more even.

Figure 10:
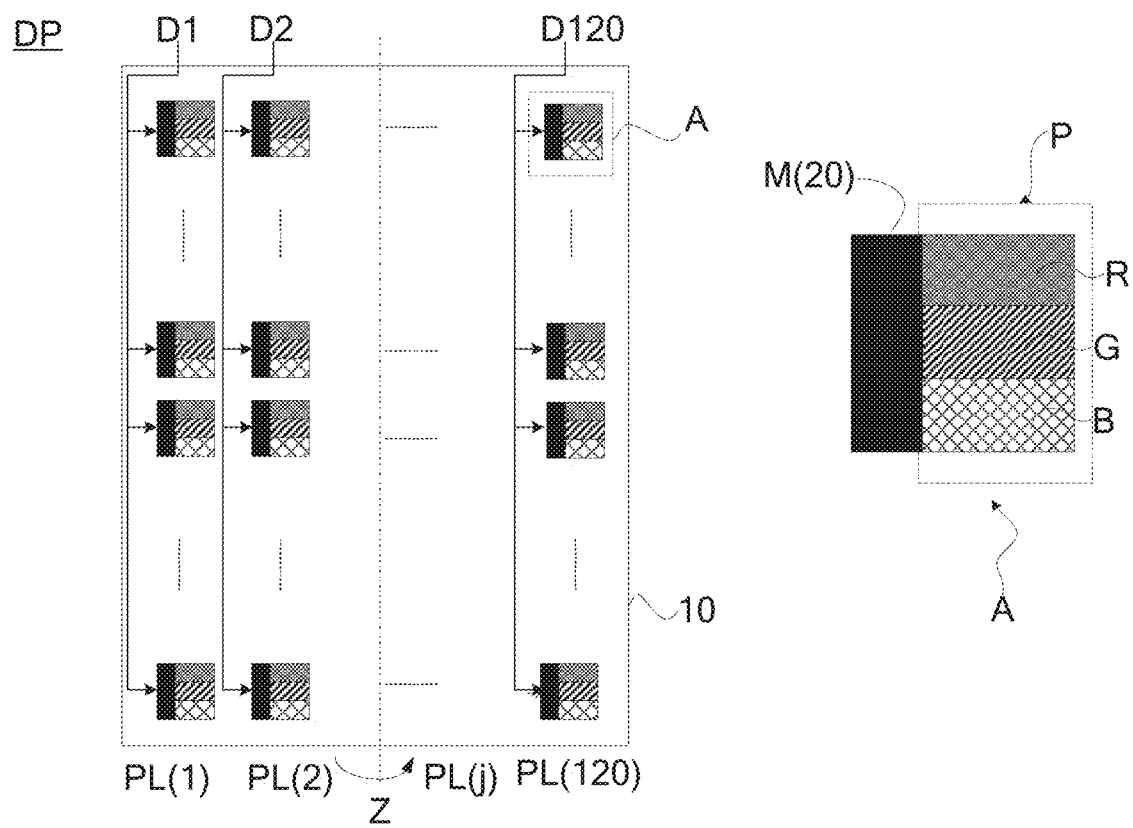
FIG. 10 is a structural diagram of yet another display panel, in accordance with some embodiments of the present disclosure.

Referring to FIG. 10, the control device 20 in the rotating display apparatus will be described below by taking an example where the rotating display apparatus is the second rotating display apparatus, the pixel array 10 is a matrix of m×n (m is equal to 120, and n is equal to 200 (m=120, n=200)), and each pixel column in the pixel array 10 operates at a respective refresh frequency shown in FIG. 8B.

In some embodiments, with continued reference to FIG. 10, the control device 20 in the rotating display apparatus includes a plurality of drivers M, and each driver M is coupled to a single pixel unit P to constitute a driving display unit A. In the driving display unit A, the pixel unit P includes three sub-pixels, which are an R sub-pixel, a G sub-pixel, and a B sub-pixel. A driver M corresponds to a single pixel unit P and is coupled to the pixel unit P. For example, the driver M may be a pixel driver chip (pixel integrated circuit (Pixel IC)), the driver M is located on the display panel DP, and the driver M is disposed next to the pixel unit P (that is, the driver M is disposed next to the pixel unit P corresponding thereto).

The driver M is configured to: receive driving information including an identifier and pixel data of at least one pixel unit P; identify an identifier of the pixel unit P coupled thereto included in the identifier of the at least one pixel unit P; and drive, according to pixel data of the pixel unit P coupled thereto in the driving information, the pixel unit P coupled thereto to operate at a refresh frequency of the pixel unit P coupled thereto.

For example, in a rotating display apparatus, a pixel unit corresponds to a unique identifier. That is to say, according to an identifier, only a unique pixel unit corresponding thereto can be found in the rotating display apparatus. The identifier of the pixel unit may be a name or an address of the pixel unit. For example, the identifier of the pixel unit may be a position coordinate of the pixel unit in the pixel array. For example, an identifier of a pixel unit located in a first row and a first column of the pixel array 10 is $P_{11}$, an identifier of a pixel unit located in the first row and a second column of the pixel array 10 is $P_{12}$, and an identifier of a pixel unit located in an i-th row and a j-th column of the pixel array 10 is $P_{ij}$. In addition, since the drivers M are in one-to-one correspondence with the pixel units P, the identifier of the pixel unit P may also be an identifier of the driver M, e.g., may be an identity document (ID) of the driver M. The identifier of the pixel unit may be configured before the rotating display apparatus leaves the factory, and may be written into the driver corresponding to the pixel unit; and in this case, the identifier of the pixel unit is fixed. Alternatively, the identifier of the pixel unit is configured during a display initialization process of the rotating display apparatus; and in this case, the identifier of the pixel unit is variable.

As another example, the identifier of the pixel unit is unique in the unit of pixel column. That is to say, the identifier of each pixel unit in a single pixel column is unique, a single identifier can only find a single pixel unit corresponding thereto in the pixel column, and different pixel units in different pixel columns are found by the single identifier. For example, each pixel column includes two hundred pixel units, and identifiers of these pixel units may be their serial numbers, which are 1, 2, 3 . . . 200.

As another example, drivers coupled to a single pixel column are divided into at least two driver groups, and the identifier of the pixel unit is unique in the unit of driver group. For example, each pixel column includes two hundred pixel units, and correspondingly, there are two hundred drivers coupled to the pixel column. The two hundred drivers may be equally divided into two driver groups. Serial numbers of drivers in one driver group may be 1, 2, 3 . . . 100; and serial numbers of drivers in the other driver group may also be 1, 2, 3 . . . 100. In this case, the serial number of each driver may serve as an identifier of a pixel unit coupled thereto.

Hereinafter, for convenience of description, a pixel unit is represented as $P_{ij}$, and a driver coupled to (corresponding to) the pixel unit $P_{ij}$ is represented as $M_{ij}$, where i represents that the pixel unit is located in the i-th row, and j represents that the pixel unit is located in the j-th column.

The pixel data of the pixel unit includes pixel data of each sub-pixel in the pixel unit. For example, the pixel data of the pixel unit P includes gray scales of the R sub-pixel, the G sub-pixel and the B sub-pixel in the pixel unit P. The driver may drive the pixel unit to operate according to the pixel data of the pixel unit corresponding thereto. For example, the driver converts the gray scales of the R sub-pixel, the G sub-pixel and the B sub-pixel in the pixel data of the pixel unit P into corresponding data signals (e.g., data voltages) and pulse width modulation (PWM) waves, and then drive the sub-pixels to control their respective light-emitting brightness according to their respective data signals and PWM waves, so that the pixel unit emits light of a color corresponding to the pixel data of the pixel unit P.

In the driving information, the identifier of the pixel unit corresponds to the pixel data of the pixel unit, and the driving information may include identifiers and pixel data of pixel units. When the driver $M_{ij}$ receives the driving information including the identifiers and the pixel data of pixel units, the driver $M_{ij}$ may find pixel data of the pixel unit $P_{ij}$ coupled to (corresponding to) the driver $M_{ij}$ in the driving information through an identifier of the pixel unit $P_{ij}$ and drive the pixel unit $P_{ij}$ to operate according to the found pixel data of the pixel unit $P_{ij}$.

For example, referring to FIG. 10, a piece of driving information Dj includes identifiers and pixel data of pixel units in a pixel column. For example, in the pixel array, pixel units in the pixel columns PL1 to PL120 update pixel data through driving information D1 to D120, respectively. Since the pixel units in the pixel column PL(j) operate at the same refresh frequency, drivers coupled to the pixel column may receive driving information Dj at a fixed refresh frequency. Frequencies at which different pixel columns receive respective driving information may be different.

The pixel column PL1 is taken as an example, drivers $M_{11}$ to $M_{n1}$ corresponding to pixel units $P_{11}$ to $P_{n1}$ in the pixel column PL1 all receive the driving information D1. The driving information D1 includes identifiers (e.g., 1, 2 . . . n) and pixel data of all pixel units in the pixel column PL1. When a driver $M_{i1}$ corresponding to a pixel unit $P_{i1}$ in the pixel column PL1 receives the driving information D1, the driver $M_{i1}$ queries whether there is an identifier i in the driving information D1 (i is an identifier of the pixel unit $P_{i1}$, which may be stored in the driver $M_{i1}$; for example, the driver $M_{i1}$ includes a memory for storing the identifier, and the memory may be, for example, a register, a cache, etc.). If the identifier i is found, the driver $M_{i1}$ reads pixel data $D_{i1}$ corresponding to the identifier i, and drive the corresponding pixel unit $P_{i1}$ to operate according to the read pixel data $D_{i1}$.

As another example, a piece of driving information includes identifiers and pixel data of part of the pixel units in a single pixel column in a current pixel frame. The part of pixel units are pixel units whose pixel data are changed compared to a previous pixel frame. For example, if pixel data of a pixel unit does not change in a stereoscopic frame, a corresponding driving information does not include the pixel data of the pixel unit.

In the embodiments of the present disclosure, the pixel array is refreshed by column, refresh frequencies of different pixel columns are different, and a concept of the electronic frame is no longer applicable. Therefore, a concept of pixel frame is proposed to describe an operating condition of the pixel column. The pixel frame refers to content presented by pixel units in the pixel column being driven to operate once (i.e., a sub-image in a stereoscopic frame), which may also be referred to as a pixel column frame.

Since the refresh frequency of each pixel column in the pixel array needs to be controlled by the control device, the drivers in the control device also need to receive the refresh frequencies of the pixel units. For example, the driver receives a vertical synchronization (Vsync) frequency of a pixel column through a line, and the received Vsync frequency is the refresh frequency of the pixel column; the driver corresponding to the pixel column drives the pixel unit coupled thereto to operate according to the received Vsync frequency and driving information.

In some embodiments, the driver $M_{ij}$ is further configured to: receive a frequency indication signal whose frequency is the refresh frequency of the pixel unit $P_{ij}$ coupled to the driver $M_{ij}$; and drive, according to the driving information, the pixel unit $P_{ij}$ to operate at the frequency of the frequency indication signal. For example, in response to a trigger edge (e.g., a rising edge or a falling edge) of the frequency indication signal, the driver $M_{ij}$ drives the pixel unit $P_{ij}$ to operate according to the stored latest pixel data of the pixel unit $P_{ij}$. For example, the frequency of the frequency indication signal is the Vsync frequency, and in response to a trigger edge (e.g., a rising edge or a falling edge) of each Vsync frequency, the driver $M_{ij}$ drives the pixel unit $P_{ij}$ to operate according to the stored latest pixel data of the pixel unit $P_{ij}$.

The pixel column PL1 is taken as an example, the drivers $M_{11}$ to $M_{n1}$ corresponding to the pixel units $P_{11}$ to $P_{n1}$ in the pixel column PL1 all receive the driving information D1. The driving information D1 includes identifiers and pixel data of part of the pixel units in the pixel column PL1. For example, the driving information D1 includes identifiers and pixel data of a pixel unit $P_{21}$ and a pixel unit $P_{31}$. After the drivers $M_{11}$ to $M_{n1}$ receive the driving information D1, the drivers compare the identifiers included in the driving information D1 with respective identifiers stored thereby. For example, if an identifier stored in a driver $M_{21}$ is 2, the driver $M_{21}$ may find pixel data corresponding to the identifier 2 in the driving information D1, and store the pixel data corresponding to the identifier 2 (for example, the driver $M_{21}$ stores the pixel data in a memory (e.g., a storage circuit such as a register, a cache, etc.)), and drive the pixel unit $P_{21}$ to operate according to the stored pixel data and the received Vsync frequency. Similarly, a driver $M_{31}$ may also read and store pixel data of the pixel unit $P_{31}$ from the driving information D1 according to an identifier 3, and drive the pixel unit $P_{31}$ to operate according to the read pixel data and the Vsync frequency.

In a case where the piece of driving information includes the identifiers and pixel data of part of the pixel units in the pixel column, the driving information includes pixel data of pixel units whose pixel data needs to be updated. For pixel units whose pixel data is not necessary to be updated, the driving information does not need to include corresponding pixel data. In this way, an amount of data that needs to be transmitted during the display process of the rotating display apparatus may be reduced.

In some embodiments, the driver $M_{ij}$ is further configured to: identify that the identifier of the at least one pixel unit included in the received driving information does not include the identifier of the pixel unit $P_{ij}$ coupled thereto; and drive the pixel unit $P_{ij}$ to maintain the currently displayed color according to the refresh frequency of the pixel unit $P_{ij}$.

That is to say, in a case where the pixel data of the pixel unit $P_{ij}$ in the current pixel frame is unchanged relative to the pixel data of the pixel unit $P_{ij}$ in the previous pixel frame, the driving information received by the driver $M_{ij}$ this time does not include the pixel data of the pixel unit $P_{ij}$ operating in the current pixel frame. Therefore, the driver $M_{ij}$ drives the pixel unit $P_{ij}$ to operate according to the latest one of the pixel data of the pixel unit $P_{ij}$ received in the past (referred to as the latest history pixel data hereinafter). For example, if the current pixel frame is a y-th pixel frame, and driving information of the y-th pixel frame does not include the pixel data of the pixel unit $P_{ij}$, but driving information of a (y−1)-th pixel frame (i.e., the previous pixel frame) includes the pixel data of the pixel unit $P_{ij}$, the driver $M_{ij}$ drives the pixel unit $P_{ij}$ to operate according to the pixel data of the pixel unit $P_{ij}$ of the (y−1)-th pixel frame. If driving information of both the y-th pixel frame and the (y−1)-th pixel frame does not include the pixel data of the pixel unit $P_{ij}$, but driving information of a (y−2)-th pixel frame includes the pixel data of the pixel unit $P_{ij}$ (i.e., the latest history pixel data), the driver $M_{ij}$ drives the pixel unit $P_{ij}$ to operate in the (y−1)-th pixel frame according to the pixel data of the pixel unit $P_{ij}$ of the (y−2)-th pixel frame, and also drives the pixel unit $P_{ij}$ to operate in the y-th pixel frame according to the pixel data of the pixel unit $P_{ij}$ of the (y−2)-th pixel frame, which is equivalent to driving the pixel unit $P_{ij}$ to operate according to the pixel data of the pixel unit $P_{ij}$ of the (y−1)-th pixel frame. Thus, the pixel unit $P_{ij}$ is lit up according to the pixel data of the previous pixel frame, and displays the same color as the previous pixel frame. In this case, the driver $M_{ij}$ may further include a storage circuit (or a memory) to store the pixel data of the pixel unit $P_{ij}$ received each time. Thus, in a case where the driving information received in the next pixel frame does not include the pixel data of the pixel unit $P_{ij}$, the driver $M_{ij}$ may also drive the corresponding pixel unit $P_{ij}$ to operate according to the pixel data stored in the storage circuit.

The pixel column PL1 is taken as an example, the drivers $M_{11}$ to $M_{n1}$ corresponding to the pixel units $P_{11}$ to $P_{n1}$ in the pixel column PL1 all receive the driving information D1. The driving information D1 includes identifiers and pixel data of part of the pixel units in the pixel column PL1. For example, the driving information D1 includes the identifiers and the pixel data of the pixel unit $P_{21}$ and the pixel unit $P_{31}$. If a driver M1 does not find an identifier of a pixel unit $P_{11}$ in the driving information, the driver $M_{11}$ will drive the pixel unit $P_{11}$ to operate according to the stored pixel data of the pixel unit $P_{11}$ and the received Vsync frequency, so that the pixel unit $P_{11}$ may maintain the currently displayed color.

As another example, a piece of driving information may include identifiers of all the pixel units and pixel data of part of the pixel units in the pixel column. If the driver $M_{ij}$ finds the identifier of the pixel unit $P_{ij}$ in the received driving information D, but pixel data corresponding to the identifier of the pixel unit $P_{ij}$ is empty, it is not necessary for the pixel unit $P_{ij}$ to update the pixel data. Thus, the driver $M_{ij}$ drives the pixel unit $P_{ij}$ to operate according to the stored pixel data of the pixel unit $P_{ij}$ and the received Vsync frequency.

In this embodiment, the driver may continue to drive the corresponding pixel unit to operate according to the pixel data of the corresponding pixel unit in the previous pixel frame (i.e., the pixel data used when the previous pixel frame is displayed), so that the color currently displayed by the pixel unit may be maintained, which avoids a problem of brightness attenuation caused by a fact that the pixel unit cannot be driven without the update of pixel data for a long time.

In some embodiments, the driver $M_{ij}$ is further configured to: store received pixel data of the pixel unit $P_{ij}$ coupled thereto in sequence according to a writing frequency; and read the stored pixel data in a stored order at the refresh frequency of the pixel unit $P_{ij}$, so as to drive, according to the read pixel data, the pixel unit $P_{ij}$ to operate at the refresh frequency of the pixel unit $P_{ij}$. The writing frequency is greater than or equal to the refresh frequency of the pixel unit $P_{ij}$ coupled to the driver $M_{ij}$.

The writing frequency of the driver $M_{ij}$ is a frequency at which the driver $M_{ij}$ is written into the pixel data of the pixel unit $P_{ij}$ coupled thereto. For example, the writing frequency of the driver $M_{ij}$ is the refresh frequency of the pixel unit $P_{ij}$. For example, a piece of driving information includes identifiers and pixel data of pixel units in a pixel column PL(j), and a frequency of the driving information received by each driver ($M_{1j}, M_{2j} \ldots M_{nj}$) is the refresh frequency of the pixel unit ($P_{1j}, P_{2j} \ldots P_{nj}$) coupled to the driver, i.e., the refresh frequency of the pixel column PL(j). Every time each driver receives a piece of driving information, it may find the pixel data of the pixel unit corresponding thereto from the driving information, write (store) the pixel data into itself (for example, it may write the pixel data into the memory of the driver), and drive the corresponding pixel unit to operate according to the written pixel data. As another example, a piece of driving information only includes identifiers and pixel data of part of the pixel units in the pixel column PL(j), and drivers (some of $M_{1j}, M_{2j} \ldots M_{nj}$) coupled to the part of the pixel units each write (store) the read pixel data into itself, and the remaining drivers (the rest of $M_{ij}, M_{2j} \ldots M_{nj}$) each copy and store the pixel data of the pixel unit coupled thereto in the previous pixel frame. As yet another example, a piece of driving information includes identifiers of all pixel units ($P_{1j}, P_{2j} \ldots P_{nj}$) in a single pixel column PL(j) and pixel data of part of the pixel units (some of $P_{1j}, P_{2j} \ldots P_{nj}$) in the pixel column PL(j). In this case, part of the drivers $M_{1j}, M_{2j} \ldots M_{ij}$ each can read pixel data of the corresponding pixel unit from the driving information, and then store the obtained pixel data; the remaining part of the drivers $M_{1j}, M_{2j} \ldots M_{ij}$ each cannot find pixel data of the corresponding pixel unit from the driving information (that is, the pixel data of the corresponding pixel unit is empty), and then copy and store the pixel data of the corresponding pixel unit in the previous pixel frame.

The driver continuously reads the pixel data from the driving information or copies the pixel data in the previous pixel frame at the refresh frequency of the corresponding pixel unit, and writes the pixel data corresponding to each pixel frame into itself, so that the driver may find the corresponding pixel data in each pixel frame to drive the corresponding pixel unit to operate, which avoids display errors caused by data reading errors. As a result, it is conducive to improving an accuracy of display.

As another example, the writing frequency of the driver $M_{ij}$ (i.e., any driver) is greater than or equal to the refresh frequency of each of the pixel units (i.e., m×n pixel units). The writing frequencies of the drivers (i.e., m×n drivers) may be equal, each of which is greater than or equal to a maximum value among refresh frequencies of the m×n pixel units (referred to as a maximum refresh frequency of the pixel array hereinafter). In this case, the driver writes received multiple pixel data of the pixel unit coupled to the driver into itself one by one according to the writing frequency, and read the stored pixel data one by one in the stored order at the refresh frequency of the corresponding pixel unit, so that the driver drives the pixel unit coupled thereto to operate according to the refresh frequency of the pixel unit coupled thereto and the read pixel data.

Through the high-frequency writing, the driver corresponding to each pixel unit sequentially drives the pixel unit to operate according to the refresh frequency of the pixel unit and the multiple pixel data received at the writing frequency, thereby reducing a difficulty of controlling the writing frequency.

In some embodiments, the driver $M_{ij}$ includes a storage queue. The driver $M_{ij}$ is configured to: receive the pixel data of the pixel unit $P_{ij}$; write the received pixel data of the pixel unit $P_{ij}$ into the storage queue at the writing frequency; read the pixel data of the pixel unit $P_{ij}$ from the storage queue in the written order at a reading frequency; and generate a driving signal according to the read pixel data. The reading frequency is the refresh frequency of the pixel unit $P_{ij}$ coupled to the driver $M_{ij}$. The driving signal is configured to drive the pixel unit $P_{ij}$ to operate.

Figure 11:
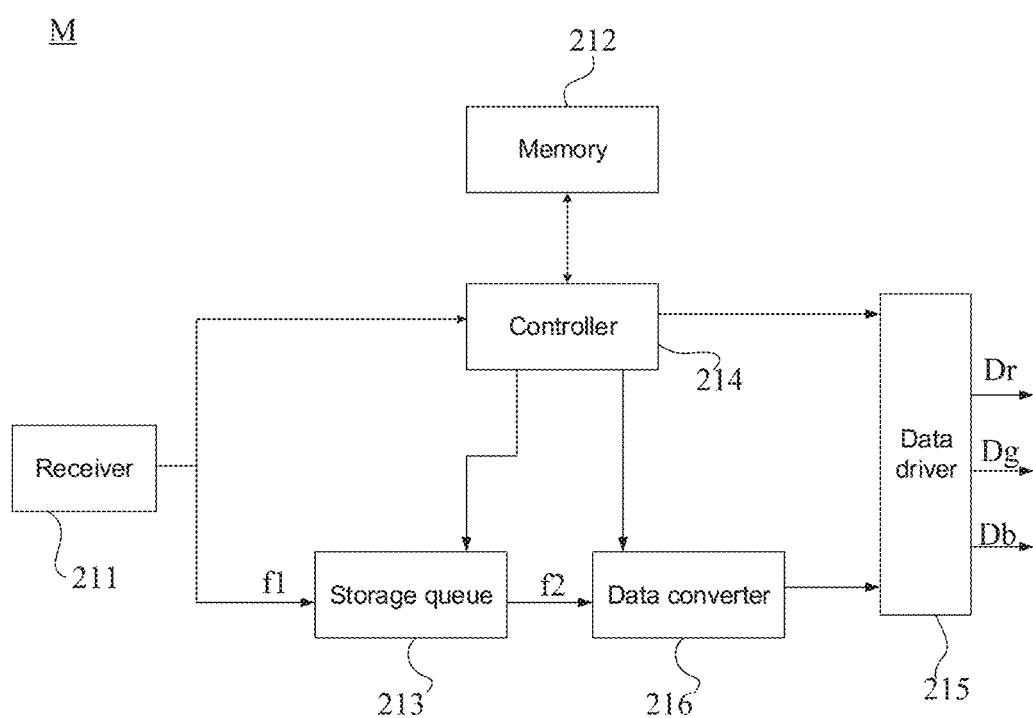
FIG. 11 is a structural diagram of a driver, in accordance with some embodiments of the present disclosure.

For example, referring to FIG. 11, the driver $M_{ij}$ includes a receiver 211, a memory 212, a storage queue 213, a controller 214, a data driver 215 and a data converter 216.

The receiver 211 is configured to receive the pixel data of the pixel unit $P_{ij}$ coupled thereto. The memory 212 is configured to store the writing frequency f1 and the reading frequency f2, and the reading frequency f2 is the refresh frequency of the pixel unit $P_{ij}$. The controller 214 is configured to: write the received pixel data of the pixel unit $P_{ij}$ into the storage queue 213 at the writing frequency f1; read the pixel data from the storage queue 213 in the written order at the reading frequency f2; and transmit the read pixel data to the data driver 215. The data driver 215 is configured to generate a driving signal according to the received pixel data, and the driving signal is configured to drive the pixel unit $P_{ij}$ to operate.

For example, the writing frequencies of the drivers corresponding to the pixel units (i.e., m×n pixel units) are equal and are all equal to the maximum refresh frequency of the pixel array. The driver $M_{ij}$ is configured to receive multiple pixel data of the pixel unit $P_{ij}$ through the receiver 211. For example, the pixel data received by the receiver 211 is pixel data of the pixel unit $P_{ij}$ identified by the controller 214 in the driver $M_{ij}$.

The controller 214 writes the pixel data in the receiver 211 into the storage queue 213 at the writing frequency f1. For example, the controller 214 operates according to a first clock signal (i.e., being a clock signal adapted to the writing frequency f1). For example, at each rising edge of the clock signal, the controller 214 determines whether the receiver 211 receives the pixel data of the pixel unit $P_{ij}$; and if the controller 214 determines that the receiver 211 receives the pixel data of the pixel unit $P_{ij}$, the controller 214 writes the received pixel data of the pixel unit $P_{ij}$ into a storage bit of the storage queue 213 sequentially; if the controller 214 determines that the receiver 211 does not receive the pixel data of the pixel unit $P_{ij}$, the controller 214 copies pixel data of the pixel unit $P_{ij}$ stored in a previous storage bit to a current storage bit to be written. In addition, the controller 214 also reads the pixel data sequentially from the storage queue 213 in the written order at the reading frequency f2, and transmits the read pixel data to the data driver 215.

The data converter 216 converts the received pixel data into a data analog signal, and a process of which may include the controller 214 controlling the data converter 216 to generate a data signal and a driving time control signal (e.g., a PWM wave) according to the pixel data output by the storage queue 213.

The data driver 215 generates the driving signal according to the data analog signal, and a process of which includes the data driver 215 generating the driving signal for controlling the sub-pixels to emit light according to the corresponding data signal and PWM wave. For example, the driving signal includes a driving signal Dr of the R sub-pixel, a driving signal Dg of the G sub-pixel and a driving signal Db of the B sub-pixel. In some embodiments, referring to FIG. 12, the control device 20 further includes a processor 220. For example, the processor 220 is coupled to the plurality of drivers $M_{11}$ to $M_{nm}$ on the display panel through a plurality of signal lines, respectively. The processor 220 is configured to send the driving information to the driver $M_{ij}$.

Figure 12:
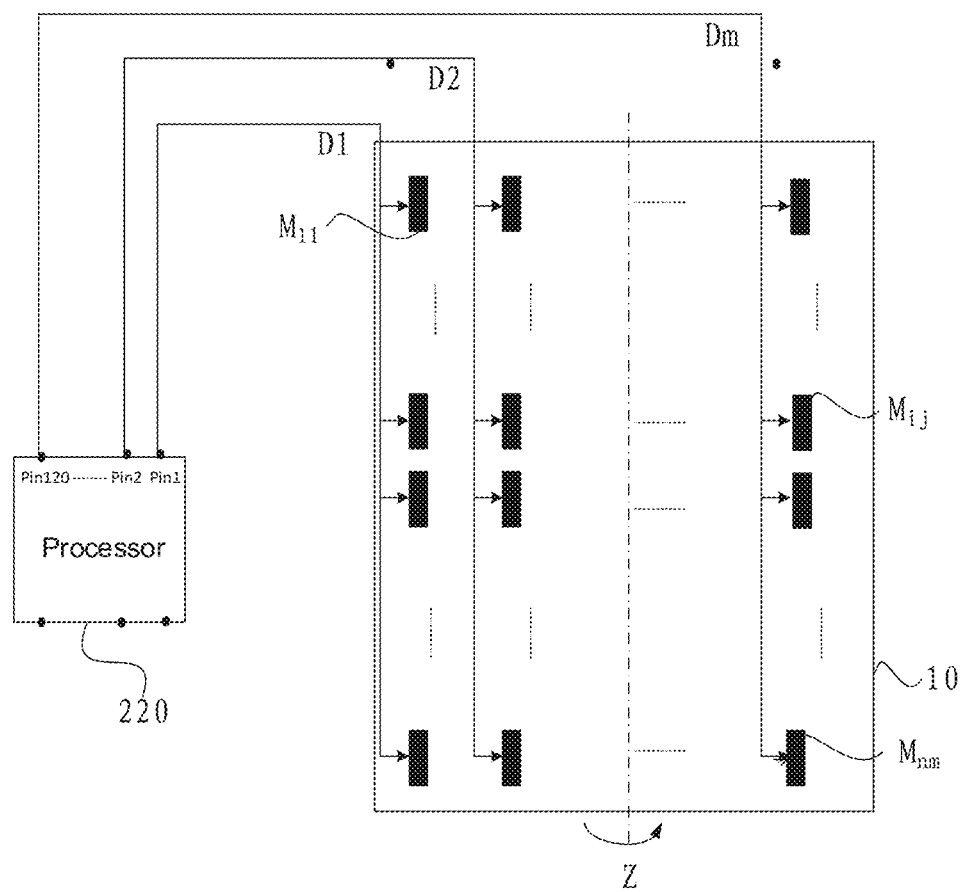
FIG. 12 is a structural diagram of a control device, in accordance with some embodiments of the present disclosure.

For example, referring to FIG. 12, the processor 220 sends driving information D1 to Dm to respective groups of drivers, and each of the groups of drivers corresponds to a pixel column in the pixel array 10 at the same time in units of pixel columns. A piece of driving information Dj may include identifiers and pixel data of pixel units. In addition, the processor 220 may also send driving information to drivers corresponding to a row of pixel units at the same time in units of pixel rows. For example, a pixel row is coupled to a gate line, and a pixel column is coupled to a data line; at a certain moment, only a single row of pixel units is turned on through the gate line, so that drivers corresponding to this row of pixel units each receive the driving information sent by the processor 220 through the data line. In this case, a piece of driving information may only include pixel data of a single pixel unit.

Figure 13:
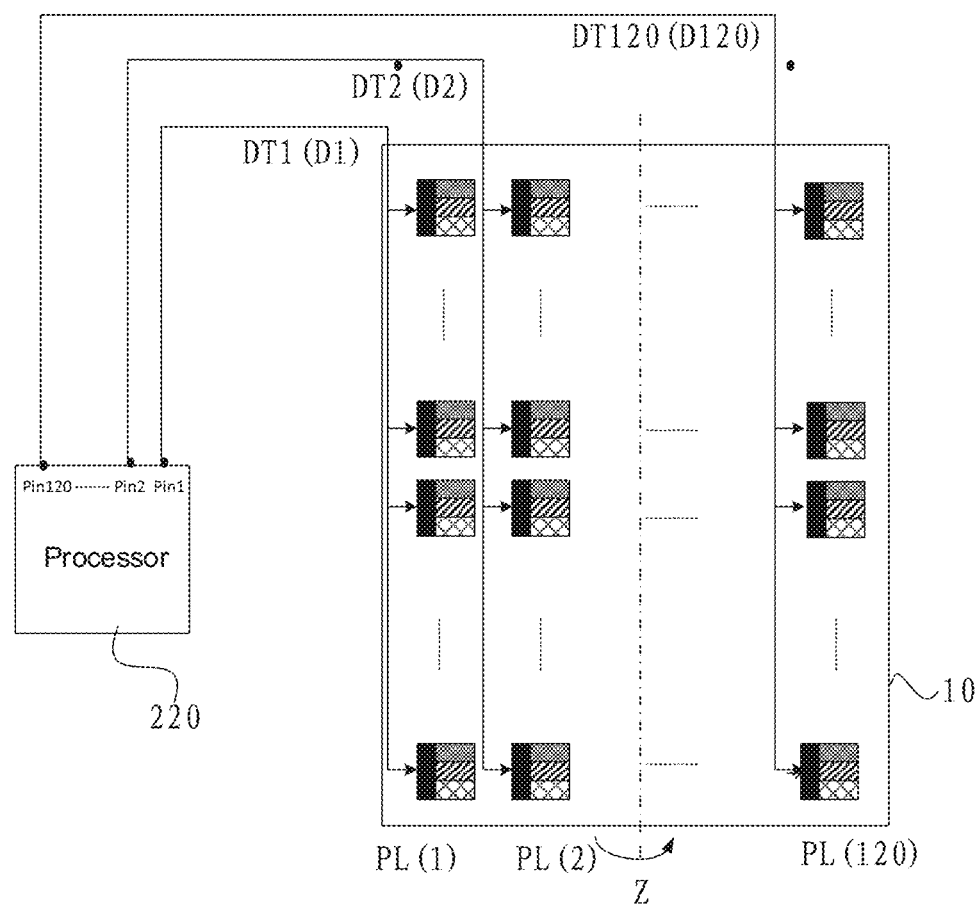
FIG. 13 is a structural diagram of another rotating display apparatus, in accordance with some embodiments of the present disclosure.

In some embodiments, referring to FIG. 13, the rotating display apparatus further includes a plurality of data lines. Drivers coupled to respective at least two pixel units in a pixel column are coupled to the processor 220 through a single data line. The processor 220 is configured to send the driving information to the drivers coupled to the data line, and the driving information includes an identifier and pixel data of at least one pixel unit of the at least two pixel units coupled to the data line.

For example, referring to FIG. 13, drivers $M_{ij}$ respectively corresponding to all pixel units in each pixel column are coupled to the processor 220 through the same data line DTj. The processor 220 may transmit the driving information Dj to a corresponding driver $M_{ij}$ through the data line $DT_j$. For example, the drivers $M_{11}$ to $M_{n1}$ corresponding to the pixel units in the pixel column PL1 are coupled to the processor 220 through the data line $DT_1$, and receive the driving information D1 sent by the processor 220 through the data line $DT_1$. The drivers $M_{12}$ to $M_{n2}$ corresponding to the pixel units in the pixel column PL2 are coupled to the processor 220 through the data line $DT_2$, and receive the driving information D2 sent by the processor 220 through the data line $DT_2$.

In some embodiments, drivers coupled to the pixel column are divided into at least two driver groups; drivers in a driver group are coupled to the processor 220 through a data line, and drivers in different driver groups are coupled to the processor 220 through different data lines. That is to say, the drivers coupled to the pixel column are coupled to the processor 220 through at least two data lines, and each of the drivers is coupled to the processor 220 through a single data line.

Figure 14:
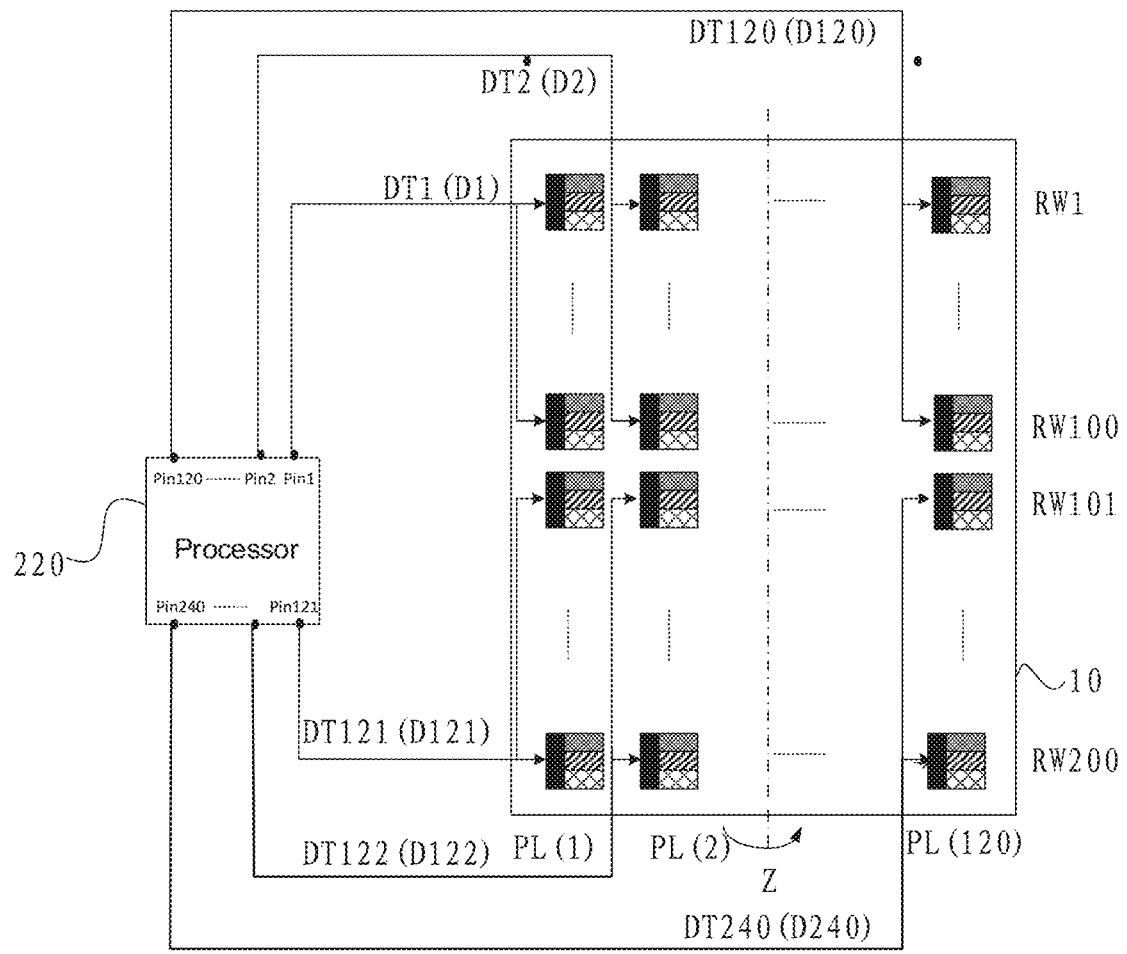
FIG. 14 is a structural diagram of yet another rotating display apparatus, in accordance with some embodiments of the present disclosure.

For example, referring to FIG. 14, the drivers coupled to the pixel column are coupled to the processor 220 through two data lines. For example, drivers coupled to a first ½ of pixel units in the pixel column are coupled to one data line (that is, pixel units located in pixel rows RW1 to RW100 of the pixel column are coupled to one data line), and drivers coupled to a last ½ of pixel units in the pixel column are coupled to the other data line (that is, pixel units located in pixel rows RW101 to RW200 of the pixel column are coupled to the other data line). In a case where the drivers coupled to the pixel column are coupled to the processor 220 through two data lines, a piece of driving information transmitted by the data line includes at most identifiers and pixel data of half of the pixel units in the pixel column, thereby reducing an amount of data contained in the piece of driving information. In a case where the drivers coupled to the pixel column are coupled to the processor 220 through more than two data lines, an amount of data contained in the piece of driving information transmitted by the data line may be smaller. Since the data line needs to be coupled to a pin of the processor 220, when the number of data lines is increased, the number of pins of the processor 220 must be increased correspondingly. For example, referring to FIG. 14, in the case where the drivers coupled to the pixel column are coupled to the processor 220 through two data lines, the number of pins of the processor 220 is increased by 120.

Of course, in the case where the drivers coupled to the pixel column are coupled to the processor 220 through two data lines, the number of drivers coupled to each data line may not be equal, and thus, the number of identifiers at most included in a piece of driving information and the amount of pixel data of pixel units at most included in the piece of driving information may also be changed.

In some embodiments, the processor 220 is configured to send driving information to each driver at a first sending frequency corresponding to the driver, and the first sending frequency corresponding to the driver is equal to the refresh frequency of the pixel unit coupled to the driver. Alternatively, the processor 220 is configured to send the driving information to each driver at a second sending frequency, and the second sending frequency is greater than or equal to the refresh frequency of each pixel unit in the pixel array.

For example, the first sending frequency is equal to the writing frequency. As another example, the second sending frequency is a refresh frequency of a pixel unit with the maximum refresh frequency in the pixel array.

Figure 16:
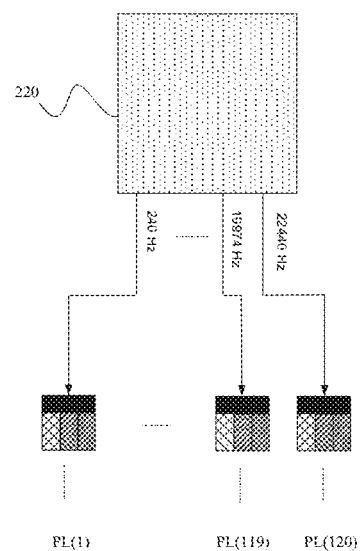
FIG. 16 is a structural diagram of yet another rotating display apparatus, in accordance with some embodiments of the present disclosure.

For example, in a case where the first sending frequency corresponding to each driver is equal to the refresh frequency of the pixel unit coupled to the driver, the processor 220 sends the driving information to each driver at the first sending frequency corresponding to the driver. In the pixel array provided in the embodiments of the present disclosure, since the refresh frequencies of the pixel units in the pixel column are the same, the processor 220 may send driving information to each driver coupled to the pixel column at the first sending frequency through a single data line. Referring to FIG. 16, FIG. 16 shows that the processor 220 sends driving information to pixel columns in the pixel array shown in FIG. 8A at respective frequencies shown in FIG. 8B.

In some embodiments, in a case where the pixel data of the pixel unit coupled to the driver in the current pixel frame is different from the pixel data of the pixel unit in the previous pixel frame, the driving information sent by the processor to the driver includes the identifier of the pixel unit corresponding to the driver and the pixel data of the pixel unit in the current pixel frame. In a case where the pixel data of the pixel unit coupled to the driver in the current pixel frame is the same as the pixel data of the pixel in the previous pixel frame, the driving information sent by the processor to the driver does not include the identifier of the pixel unit corresponding to the driver and the pixel data of the pixel unit in the current pixel frame.

In a case where the processor only sends identifiers of pixel units whose pixel data needs to be updated and updated pixel data each time (that is, a piece of driving information sent by the processor only includes identifiers and pixel data of part of pixel units), an amount of data processed and sent by the processor may be significantly reduced, and a need for data transmission bandwidth may also be reduced.

Figure 15:
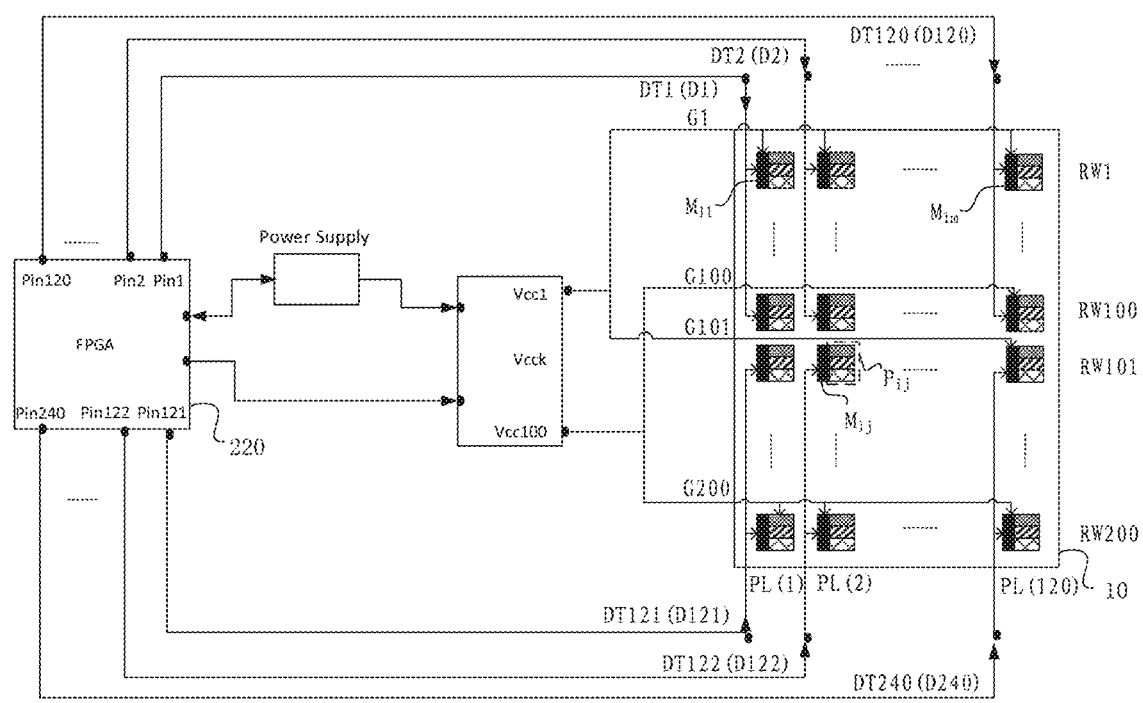
FIG. 15 is a structural diagram of yet another rotating display apparatus, in accordance with some embodiments of the present disclosure.

In some embodiments, referring to FIG. 15, the plurality of pixel units are further arranged in the plurality of pixel rows RW1 to RW200 each arranged in the direction perpendicular to the rotation axis. The rotating display apparatus further includes a plurality of gate lines G1 to G200, and drivers respectively coupled to at least two pixel units in a pixel row are coupled to the processor 220 through a gate line. For example, referring to FIG. 15, drivers corresponding to a pixel row RWi are coupled to the processor 220 through a single gate line. For example, drivers $M_{11}$ to $M_{1m}$ corresponding to the pixel row RW1 are coupled to the processor 220 through the gate line G1, drivers $M_{21}$ to $M_{2m}$ corresponding to the pixel row RW2 are coupled to the processor 220 through the gate line G2, and so on.

The processor 220 is further configured to send a turn-on signal to each driver $M_{ij}$ coupled to the gate line Gi, and is configured to send an identifier of a pixel unit $P_{ij}$ coupled to each driver $M_{ij}$ to the driver $M_{ij}$. The driver $M_{ij}$ is further configured to: receive the turn-on signal; receive the identifier of the pixel unit $P_{ij}$ coupled thereto in response to the turn-on signal; and write the received identifier of the pixel unit $P_{ij}$ into the driver $M_{ij}$.

The identifier of each pixel unit $P_{ij}$ may be written one by one during an initialization process of the rotating display apparatus 1. In a case where a gate line Gi transmits a turn-on signal to drivers $M_{ij}$ that are coupled to a pixel row RWi coupled the gate line Gi, the processor 220 may write identifiers of corresponding pixel units $P_{ij}$ into the drivers $M_{ij}$ coupled to the pixel units in this pixel row through the data lines DT1 to DTj, respectively. For example, the processor 220 firstly transmits the turn-on signal to the drivers $M_{11}$ to $M_{1m}$ coupled to the pixel row RW1 through the gate line G1, and then writes the identifiers of the corresponding pixel units into the drivers $M_{11}$ to $M_{1m}$ coupled to the pixel row RW1 through the data lines, respectively. Since the drivers $M_{11}$ to $M_{1m}$ corresponding to the pixel row RW1 are located in different pixel columns, the drivers $M_{11}$ to $M_{1m}$ each are coupled to one data line, and each data line transmits an identifier of a pixel unit $P_{ij}$ corresponding to a driver $M_{ij}$ coupled to the data line to the driver $M_{ij}$. Then, the processor 220 transmits the turn-on signal to the drivers $M_{21}$ to $M_{2m}$ coupled to the pixel row RW2 through the gate line G2, and then writes the identifiers of the corresponding pixel units into the drivers $M_{21}$ to $M_{2m}$ coupled to the pixel row RW2 through the data lines, respectively, and so on until respective identifiers of all pixel units in the pixel array are written.

Of course, a sequence in which the processor 220 writes the identifiers of the pixel units $P_{ij}$ into the drivers $M_{ij}$ corresponding to the pixel rows RW1 to RWi may be different from that in the above embodiments. For example, the processor 220 may firstly write identifiers into drivers corresponding to a last pixel row RWn in the pixel array, and may finally write identifiers into drivers corresponding to a first pixel row RW1 in the pixel array. Alternatively, the processor 220 may firstly write identifiers into drivers corresponding to a middle pixel row in the pixel array.

It will be noted that, in a case where the rotating display apparatus includes the plurality of gate lines, if a piece of driving information includes identifiers and pixel data of pixel units, the control device simultaneously transmits the turn-on signals to respective drivers through the plurality of gate lines during the display process, so that the driver coupled to each of the pixel units may receive the driving information.

In some embodiments, the rotating display apparatus further includes a plurality of switches (e.g., analog switches), and the processor is coupled to at least two gate lines through an analog switch. The number of gate lines coupled to the analog switch is equal to the number of data lines coupled to a pixel column.

For example, referring to FIG. 15, the rotating display apparatus 1 includes a plurality of analog switches Vcc, and the analog switch Vcc is configured to control a transmission of the turn-on signal to the corresponding driver. For example, the processor 220 is coupled to an analog switch Vcc(k) (any of the plurality of analog switches), and the processor 220 may control turn-on and turn-off of the analog switch Vcc(k). In a case where the processor 220 controls the analog switch Vcc(k) to be turned on, the gate line coupled to the analog switch Vcc(k) sends the turn-on signal to the driver coupled to the gate line. In a case where the analog switch Vcc(k) is coupled to the at least two gate lines, the processor 220 may send the turn-on signal to the drivers coupled to the at least two gate lines through the at least two gate lines by controlling the analog switch Vcc(k) to be turned on.

For example, referring to FIG. 15, the analog switch Vcc1 is coupled to the gate line G1 and the gate line G101, and the analog switch Vcc100 is coupled to the gate line G100 and the gate line G200, and so on. During the initialization process of the rotating display apparatus, the processor 220 writes the identifier into each driver. Since the gate line G1 and the gate line G101 simultaneously send the turn-on signal to the pixel row RW1 and the pixel row RW101, after the drivers corresponding to the pixel row RW1 and the pixel row RW101 receive the turn-on signal, the processor 220 may simultaneously write identifiers of pixel units into respective drivers coupled to the pixel row RW1 and the pixel row RW101. Similarly, the processor 220 may write identifiers of pixel units to respective drivers corresponding to other pixel rows in a sequence of every two rows, which will not be repeated.

In addition, the rotating display apparatus may further include a power supply device PS. For example, the power supply device PS is coupled to the processor 220 and the plurality of analog switches, and is configured to provide power to the processor 220 and the plurality of analog switches, so as to ensure effective control on the plurality of analog switches by the processor 220.

Figure 17:
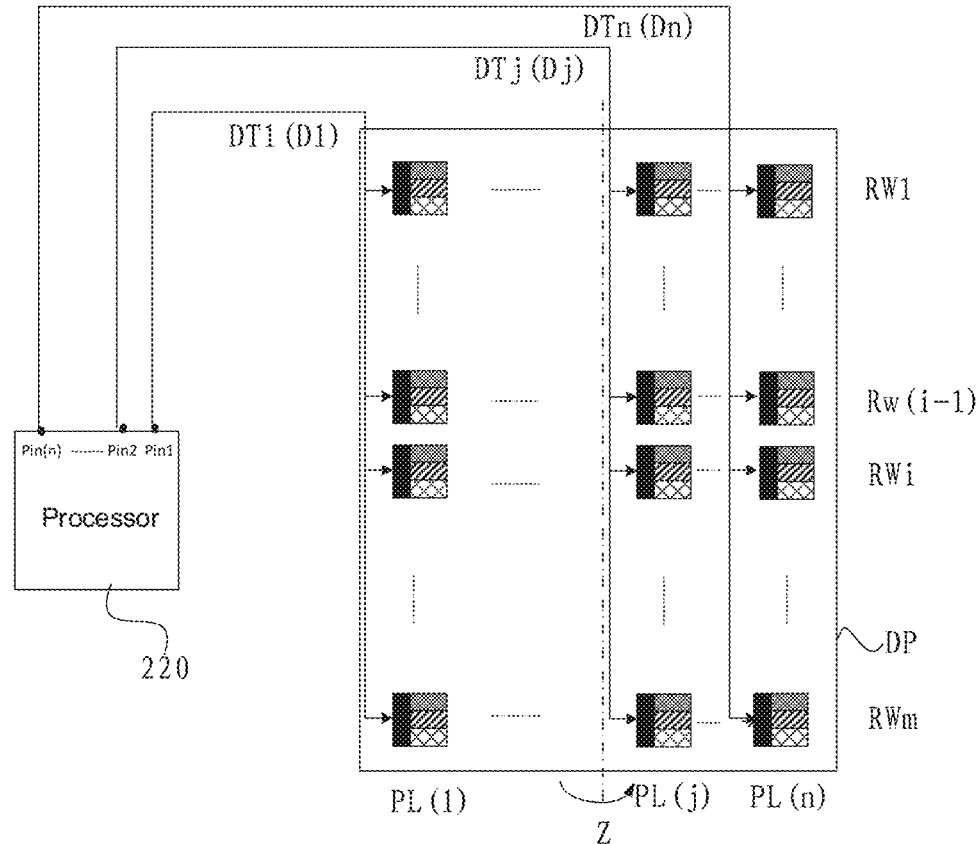
FIG. 17 is a diagram showing signal transmission of a method of driving a rotating display apparatus, in accordance with some embodiments of the present disclosure.
Figure 17:
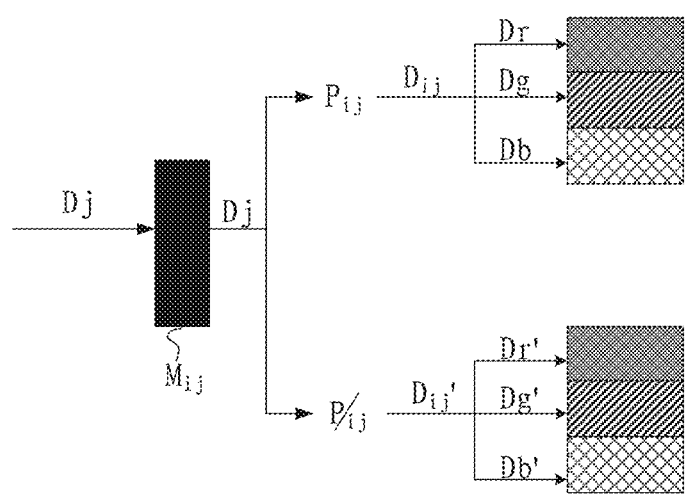

The embodiments of the present disclosure further provide a method of driving the rotating display apparatus described in any of the above embodiments. Referring to FIG. 17, the method includes S1 and S2.

In S1, the processor 220 sends driving information D to the drivers M coupled to a data line DT; the driving information D includes an identifier and pixel data of at least one pixel unit of at least two pixel units coupled to the data line DT.

For example, the processor 220 is coupled to the plurality of drivers M through a plurality of data lines DT. For example, the plurality of drivers M are located in the display panel DP, and a driver corresponds to and is coupled to a pixel unit P. The pixel columns PL1 to PL120 are coupled to the processor 220 through the data lines DT1 to DTn, respectively.

The processor 220 sends the driving information to the drivers corresponding to the pixel column through the data line DT. For example, the processor 220 sends driving information D1 to the drivers $M_{11}$ to $M_{m1}$ corresponding to the pixel column PL1 through the data line DT1, and sends driving information Di to the drivers $M_{1i}$ to $M_{mi}$ corresponding to the pixel column PLi through the data line DTi.

In S2, the driver $M_{ij}$ receives the driving information Dj; in a case where the identifier of the at least one pixel unit includes an identifier of a pixel unit $P_{ij}$ coupled to the driver $M_{ij}$, the driver $M_{ij}$ drives, according to pixel data $D_{ij}$ of the pixel unit coupled thereto in the driving information, the pixel unit coupled thereto to operate at the refresh frequency of the pixel unit coupled to thereto; and in a case where the identifier of the at least one pixel unit does not include the identifier of the pixel unit $P_{ij}$ coupled to the driver $M_{ij}$, the driver $M_{ij}$ drives the pixel unit coupled thereto to maintain a currently displayed color at the refresh frequency of the pixel unit coupled thereto.

The driver $M_{ij}$ is taken as an example, after the driver $M_{ij}$ receives driving information Dj, the driver $M_{ij}$ compares the identifier of the pixel unit $P_{ij}$ in its memory with identifiers included in the driving information Dj; if the driving information Dj includes the identifier of the pixel unit $P_{ij}$, the driver $M_{ij}$ reads pixel data $D_{ij}$ corresponding to the identifier of the pixel unit $P_{ij}$, generates a driving signal according to the pixel data $D_{ij}$, and drives the corresponding pixel unit to operate through the driving signal. For example, the driving signal includes driving signals Dr, Dg, and Db of respective R sub-pixel, G sub-pixel and B sub-pixel. If the driving information Dj does not include the identifier of the pixel unit $P_{ij}$, the driver $M_{ij}$ generates a driving signal according to pixel data $D_{ij}'$ in its memory, and drives the corresponding pixel unit to operate through the driving signal. For example, the pixel data $D_{ij}'$ is pixel data of the pixel unit in a previous pixel frame; driving signals Dr, Dg' and Db' of the respective R sub-pixel, G sub-pixel and B sub-pixel in a current pixel frame are the same as driving signals of the respective R sub-pixel, R sub-pixel and B sub-pixel in the previous pixel frame, respectively; and the pixel unit displays the same color as that in the previous pixel frame.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A rotating display apparatus, comprising:
   a pixel array capable of rotating around a rotation axis located in the pixel array, wherein the pixel array includes a plurality of pixel units arranged in a plurality of pixel columns distributed in a direction perpendicular to the rotation axis, and pixel units in each pixel column are arranged in a direction parallel to the rotation axis and operate at a same refresh frequency; a refresh frequency of pixel units in a pixel column close to the rotation axis is less than a refresh frequency of pixel units in a pixel column far away from the rotation axis; and
   a control device configured to control the pixel units in each pixel column to operate at a refresh frequency corresponding to the pixel column.

2. The rotating display apparatus according to claim 1, wherein
   the plurality of pixel columns are divided into a plurality of pixel groups, each pixel group includes at least one pixel column distributed continuously, and refresh frequencies of pixel units in each pixel group are the same; and
   in pixel columns located on a same side of the rotation axis, refresh frequencies of pixel groups arranged in a direction away from the rotation axis gradually increase.

3. The rotating display apparatus according to claim 2, wherein
   in the plurality of pixel groups, a number of pixel column included in each pixel group is the same; or
   in the plurality of pixel groups and in the pixel columns located on the same side of the rotation axis, numbers of pixel columns included in the pixel groups arranged in the direction away from the rotation axis sequentially decrease.

4. The rotating display apparatus according to claim 2, wherein
   in the pixel columns located on the same side of the rotation axis, the refresh frequencies of the pixel groups arranged in the direction away from the rotation axis constitutes an arithmetic progression.

5. The rotating display apparatus according to claim 1, wherein
   each pixel unit in the pixel column far away from the rotation axis forms a plurality of first voxels, and each pixel unit in the pixel column close to the rotation axis forms a plurality of second voxels; a first voxel distance is equal to a second voxel distance;
   wherein the first voxel distance is a distance between two adjacent first voxels, and the second voxel distance is a distance between two adjacent second voxels.

6. The rotating display apparatus according to claim 1, wherein
   the rotation axis is a symmetry axis of the pixel array; and
   refresh frequencies of two pixel columns respectively located on different sides of the rotation axis and having a same distance to the rotation axis are the same.

7. The rotating display apparatus according to claim 1, wherein
   the control device includes a plurality of drivers, and each driver is coupled to a single pixel unit; and
   the driver is configured to: receive driving information including an identifier and pixel data of at least one pixel unit; identify an identifier of a pixel unit coupled thereto that is included in the identifier of the at least one pixel unit; and drive, according to pixel data of the pixel unit coupled thereto in the driving information, the pixel unit coupled thereto to operate at a refresh frequency of the pixel unit coupled thereto.

8. The rotating display apparatus according to claim 7, wherein
the driver is further configured to: identify that the identifier of the pixel unit coupled thereto is not included in the identifier of the at least one pixel unit; and drive the pixel unit coupled thereto to maintain a currently displayed color at the refresh frequency of the pixel unit coupled thereto.

9. The rotating display apparatus according to claim 7, wherein
the driver is further configured to: receive a frequency indication signal, a frequency of the frequency indication signal being the refresh frequency of the pixel unit coupled to the driver; and drive, according to the driving information, the pixel unit coupled to the driver to operate at the frequency of the frequency indication signal; or
the driver is further configured to: store received pixel data of the pixel unit coupled thereto in sequence according to a writing frequency; and read the stored pixel data in a stored order at the refresh frequency of the pixel unit coupled to thereto, so as to drive, according to the read pixel data, the pixel unit coupled thereto to operate at the refresh frequency of the pixel unit coupled thereto; wherein the writing frequency is greater than or equal to the refresh frequency of the pixel unit coupled to the driver.

10. The rotating display apparatus according to claim 9, wherein
the driver includes a storage queue; and
the driver is configured to: receive the pixel data of the pixel unit coupled thereto; write the received pixel data of the pixel unit coupled thereto into the storage queue at the writing frequency; read the pixel data from the storage queue in a written order at a reading frequency, the reading frequency being the refresh frequency of the pixel unit coupled to the driver; and generate a driving signal according to the read pixel data, the driving signal being configured to drive the pixel unit coupled to the driver to operate.

11. The rotating display apparatus according to claim 7, wherein
the control device further includes a processor; the processor is coupled to the plurality of drivers and is configured to send the driving information to each driver.

12. The rotating display apparatus according to claim 11, further comprising:
a plurality of data lines; drivers respectively coupled to at least two pixel units in a single pixel column being coupled to the processor through a data line; wherein
the processor is configured to send the driving information to the drivers coupled to the data line, and the driving information includes the identifier and pixel data of the at least one pixel unit in the at least two pixel units coupled to the data line.

13. The rotating display apparatus according to claim 12, wherein
drivers coupled to the single pixel column are divided into at least two driver groups, wherein drivers in a driver group are coupled to the processor through one data line, and drivers in different driver groups are coupled to the processor through different data lines.

14. The rotating display apparatus according to claim 11, wherein
the processor is configured to send the driving information to each driver at a first sending frequency corresponding to the driver; the first sending frequency corresponding to the driver is equal to the refresh frequency of the pixel unit coupled to the driver; or
the processor is configured to send the driving information to each driver at a second sending frequency; the second sending frequency is greater than or equal to a refresh frequency of each pixel unit in the pixel array.

15. The rotating display apparatus according to claim 14, wherein
pixel data of the pixel unit coupled to the driver in a current pixel frame is different from pixel data of the pixel unit in a previous pixel frame, the driving information sent by the processor to the driver includes the identifier of the pixel unit and the pixel data of the pixel unit in the current pixel frame; and
the pixel data of the pixel unit coupled to the driver in the current pixel frame is the same as the pixel data of the pixel unit in the previous pixel frame, the driving information sent by the processor to the driver does not include the identifier of the pixel unit and the pixel data of the pixel unit in the current pixel frame.

16. The rotating display apparatus according to claim 11, wherein
the plurality of pixel units are further arranged in a plurality of pixel rows each arranged in a direction perpendicular to the rotation axis;
the rotating display apparatus further comprises a plurality of gate lines; wherein drivers respectively coupled to at least two pixel units in a pixel row are coupled to the processor through a gate line;
the processor is further configured to send a turn-on signal to each driver coupled to the gate line; the processor is further configured to send the identifier of the pixel unit coupled to the driver to the driver; and
the driver is further configured to: receive the turn-on signal; receive the identifier of the pixel unit coupled to the driver in response to the turn-on signal; and write the received identifier of the pixel unit into the driver.

17. The rotating display apparatus according to claim 16, further comprising:
a plurality of switches, the processor being coupled to at least two gate lines through a switch in the plurality of switches, and
a plurality of data lines, drivers respectively coupled to at least two pixel units in a single pixel column being coupled to the processor through a data line in the plurality of data lines: wherein
a number of gate lines coupled to the switch is equal to a number of data lines coupled to the single pixel column.

18. A method of driving a rotating display apparatus, the method comprising:
sending, by a processor, driving information to drivers coupled to a data line, the driving information including an identifier and pixel data of at least one pixel unit in at least two pixel units coupled to the data line; and
receiving, by a driver, the driving information;
if the identifier of the at least one pixel unit includes an identifier of a pixel unit coupled to the driver, driving, by the driver, according to pixel data of the pixel unit coupled to the driver in the driving information, the pixel unit coupled to the driver to operate at a refresh frequency of the pixel unit coupled to the driver;

and if the identifier of the at least one pixel unit does not include the identifier of the pixel unit coupled to the driver, driving, by the driver, the pixel unit coupled to the driver to maintain a currently displayed color at the refresh frequency of the pixel unit coupled to the driver.

19. The rotating display apparatus according to claim 5, wherein the rotation axis is a symmetry axis of the pixel array; and refresh frequencies of two pixel columns respectively located on different sides of the rotation axis and having a same distance to the rotation axis are the same.

20. The rotating display apparatus according to claim 5, wherein the control device includes a plurality of drivers, and each driver is coupled to a single pixel unit; and the driver is configured to: receive driving information including an identifier and pixel data of at least one pixel unit; identify an identifier of a pixel unit coupled thereto that is included in the identifier of the at least one pixel unit; and drive, according to pixel data of the pixel unit coupled thereto in the driving information, the pixel unit coupled thereto to operate at a refresh frequency of the pixel unit coupled thereto.

* * * * *